US009793719B2

United States Patent
Yamaguchi et al.

(10) Patent No.: US 9,793,719 B2
(45) Date of Patent: Oct. 17, 2017

(54) NON-CONTACT POWER SUPPLY APPARATUS

(71) Applicant: DENSO CORPORATION, Kariya, Aichi-pref (JP)

(72) Inventors: Nobuhisa Yamaguchi, Nagoya (JP); Akira Sakamoto, Obu (JP); Kouji Mazaki, Kariya (JP); Kouki Nagura, Kariya (JP)

(73) Assignee: DENSO CORPORATION, Kariya (JP)

( * ) Notice: Subject to any disclaimer, the term of this patent is extended or adjusted under 35 U.S.C. 154(b) by 318 days.

(21) Appl. No.: 14/648,503

(22) PCT Filed: Nov. 29, 2013

(86) PCT No.: PCT/JP2013/082168
§ 371 (c)(1),
(2) Date: May 29, 2015

(87) PCT Pub. No.: WO2014/084347
PCT Pub. Date: Jun. 5, 2014

(65) Prior Publication Data
US 2015/0326031 A1 Nov. 12, 2015

(30) Foreign Application Priority Data
Nov. 30, 2012 (JP) ................................. 2012-262978

(51) Int. Cl.
*H01F 27/42* (2006.01)
*H02J 5/00* (2016.01)
(Continued)

(52) U.S. Cl.
CPC ............. *H02J 5/005* (2013.01); *B60L 11/182* (2013.01); *B60L 11/1812* (2013.01);
(Continued)

(58) Field of Classification Search
CPC ...... H02J 17/00; Y02T 10/7072; Y02T 90/14; B60L 11/1812; B60L 2210/30
(Continued)

(56) References Cited

U.S. PATENT DOCUMENTS

| 2007/0109708 A1 | 5/2007 | Hussman et al. |
| 2008/0129215 A1 | 6/2008 | Boys |

(Continued)

FOREIGN PATENT DOCUMENTS

| JP | 2007-501600 | 1/2007 |
| JP | 2007-507991 | 3/2007 |

(Continued)

OTHER PUBLICATIONS

International Preliminary Report on Patentability (4 pages) dated Jun. 11, 2015 issued in corresponding Japanese Application No. PCT/JP2013/082168 and English translation (9 pages)
(Continued)

*Primary Examiner* — Jared Fureman
*Assistant Examiner* — Duc M Pham
(74) *Attorney, Agent, or Firm* — Nixon & Vanderhye P.C.

(57) ABSTRACT

A non-contact power supply apparatus includes a transmission-side pad, a transmission-side resonant circuit, a reception-side pad, a reception-side resonant circuit, a power transmission circuit, a power reception circuit, and a control circuit. The control circuit controls an alternating-current voltage supplied to the transmission-side pad and an alternating-current voltage supplied to the power reception circuit, so that a power factor of the alternating current supplied from the power transmission circuit to the transmission-side pad connected to the transmission-side resonant circuit and direct-current power supplied from the power supply circuit to an on-board battery are respectively set to target values. As a result, change in power factor can be suppressed even (Continued)

when the coupling coefficient of the transmission-side pad and the reception-side pad changes, and predetermined electric power can be transmitted.

20 Claims, 15 Drawing Sheets

(51) Int. Cl.
H02J 17/00 (2006.01)
B60L 11/18 (2006.01)
H02J 7/00 (2006.01)
H02J 7/02 (2016.01)
H02J 7/04 (2006.01)

(52) U.S. Cl.
CPC ............ H02J 7/0054 (2013.01); H02J 7/025 (2013.01); H02J 7/04 (2013.01); H02J 17/00 (2013.01); B60L 2210/30 (2013.01); B60L 2210/40 (2013.01); Y02T 10/7005 (2013.01); Y02T 10/7072 (2013.01); Y02T 10/7241 (2013.01); Y02T 90/122 (2013.01); Y02T 90/127 (2013.01); Y02T 90/14 (2013.01)

(58) Field of Classification Search
USPC ........................................................ 307/104
See application file for complete search history.

(56) References Cited

U.S. PATENT DOCUMENTS

| 2008/0211478 | A1 | 9/2008 | Hussman et al. |
| 2011/0127846 | A1 | 6/2011 | Urano |
| 2011/0231029 | A1 | 9/2011 | Ichikawa et al. |
| 2011/0299313 | A1 | 12/2011 | Hussmann et al. |
| 2012/0043825 | A1* | 2/2012 | Urano ................ H02J 5/005 307/104 |
| 2012/0056580 | A1* | 3/2012 | Kai ..................... H02J 5/005 320/108 |
| 2012/0319479 | A1* | 12/2012 | Covic ................. H02J 5/005 307/31 |
| 2013/0188397 | A1* | 7/2013 | Wu ................ H02M 3/33576 363/17 |
| 2014/0035526 | A1* | 2/2014 | Tripathi ............. B60L 11/1838 320/109 |
| 2014/0239729 | A1* | 8/2014 | Covic ................. H02J 17/00 307/104 |
| 2015/0224878 | A1* | 8/2015 | Hashimoto ........... B60L 1/02 307/10.1 |
| 2016/0221441 | A1* | 8/2016 | Hall .................... B60L 1/00 |

FOREIGN PATENT DOCUMENTS

| JP | 2010-288441 | 12/2010 |
| JP | 2011-45195 | 3/2011 |
| JP | 2011-139621 | 7/2011 |
| JP | 4868077 | 11/2011 |
| JP | 2012-039707 | 2/2012 |
| JP | 2012-105503 | 5/2012 |
| JP | 2012-130173 | 7/2012 |
| WO | 2004/105208 | 12/2004 |
| WO | 2005/031944 | 4/2005 |
| WO | 2010/035321 | 4/2010 |

OTHER PUBLICATIONS

International Search Report for PCT/JP2013/082168 mailed Feb. 25, 2014, 4 pages.

* cited by examiner

NON-CONTACT POWER SUPPLY APPARATUS

CROSS-REFERENCE TO RELATED APPLICATION

This application is the U.S. national phase of International Application No. PCT/JP2013/082168 filed 29 Nov. 2013, which designated the U.S. and claims the benefit of priority from Japanese Patent Application No. 2012-262978 filed Nov. 30, 2012, the entire contents of each of which are hereby incorporated by reference.

TECHNICAL FIELD

The present invention relates to a non-contact power supply apparatus that transfers electric power without contact between a transmission side and a reception side. In particular, the present invention relates to a non-contact power supply apparatus that uses a transmission-side pad and a reception-side pad as a pair, and transmits electric power without contact from the transmission-side pad to the reception-side pad.

BACKGROUND ART

In recent years, systems for transferring electric power without contact have been receiving attention in a wide range of industrial fields, and are being vigorously researched. Conventionally, as a non-contact power supply apparatus that that uses a transmission-side pad and a reception-side pad as a pair, and transmits electric power without contact from the transmission-side pad to the reception-side pad, there is a non-contact power supply apparatus disclosed, for example, in PTL 1.

The non-contact power supply apparatus is an apparatus that transmits electric power without contact from outside of a vehicle to a load that is mounted in the vehicle. The non-contact power supply apparatus includes a primary coil, a primary-side capacitor, a secondary coil, a secondary-side capacitor, a high-frequency alternating-current (AC) power supply unit, and a rectifying unit.

The primary coil is a device that is set in a predetermined position on the ground surface in a parking space and generates alternating flux by being supplied an alternating current. The primary-side capacitor is an element that is connected in parallel with the primary coil and configures a resonant circuit together with the primary coil. The secondary coil is a device that is set in the bottom portion of a vehicle, and disposed so as to oppose the primary coil with space therebetween in the up/down (i.e., vertical) direction when the vehicle is parked in the parking space. The secondary coil generates an alternating current through electromagnetic induction by interlinking with the alternating flux generated by the primary coil. The secondary-side capacitor is an element that is connected in parallel with the secondary coil and configures a resonant circuit together with the secondary coil. The high-frequency alternating-current power supply unit is a circuit that is connected to the primary coil connected to the primary-side capacitor, and supplies a high-frequency alternating current to the primary coil connected to the primary-side capacitor. The rectifying unit is a circuit that is connected to the secondary coil connected to the secondary-side capacitor, as well as to a load. The rectifying unit rectifies the alternating current supplied from the secondary coil connected to the secondary-side capacitor, converts the rectified alternating current to a direct current, and supplies the direct current to the load.

CITATION LIST

Patent Literature

[PTL 1] JP-A-2012-105503

Technical Problem

The capacitances of the primary-side capacitor and the secondary-side capacitor are set so that, when the primary coil and the secondary coil are in a predetermined opposing state that serves as a reference, or in other words, when the coupling coefficient of the primary coil and the secondary coil is a predetermined value that serves as a reference, the power factor of the alternating current supplied from the high-frequency alternating-current power supply unit to the primary coil connected to the primary-side capacitor is 1. However, the positional relationship between the primary coil and the secondary coil changes depending on the parking position of the vehicle and the weight of cargo, and the coupling coefficient thereby changes. When the coupling coefficient changes, the power factor decreases. When the power factor decreases in accompaniment with the change in coupling coefficient, a larger current is required to be sent to transmit the same electric power. As a result, power transmission efficiency decreases. In addition, elements having a large current capacity and the like are required to be used to enable a larger current to be sent. Therefore, the size of the system increases.

SUMMARY

It is thus desired to provide a non-contact power supply apparatus that is capable of suppressing change in power factor and transmitting predetermined electric power, even when the coupling coefficient of a transmission-side pad and a reception-side pad changes.

Solution to Problem

A non-contact power supply apparatus provided by an exemplary embodiment that has been achieved to solve the above-described problems includes: a transmission-side pad that has a coil and generates magnetic flux by being supplied with alternating-current power; a transmission-side resonant circuit that is connected to the transmission-side pad and configures a resonant circuit together with the coil of the transmission-side pad; a reception-side pad that has a different coil and generates an alternating current by interlinking with the magnetic flux generated by the transmission-side pad; a reception-side resonant circuit that is connected to the reception-side pad and configures a resonant circuit together with the coil of the reception-side pad; a power transmission circuit that is connected to a direct-current (DC) power supply and to the transmission-side pad, and that converts a direct current supplied from the direct-current power supply to an alternating current and supplies the alternating current to the transmission-side pad; a power reception circuit that is connected to the reception-side pad and to a power supply target, and that converts an alternating current supplied from the reception-side pad to a direct current and supplies the direct current to the power supply target; and a control circuit that is connected to the power transmission circuit and the power reception circuit, and controls the power transmission circuit and the power reception circuit. The control circuit controls an alternating-current voltage supplied from the power transmission circuit to the transmission-side pad and an alternating-current voltage supplied from the reception-side pad to the power reception circuit, so that a power factor of the alternating current supplied from the power transmission circuit to the transmission-side pad and direct-current power supplied from the power reception circuit to the power supply target are respectively set to target values, and the control circuit transmits electric power from the direct-current power supply to the power supply target.

In this configuration, change in power factor can be suppressed even when the coupling coefficient of the transmission-side pad and the reception-side pad changes, and predetermined electric power can be transmitted.

DESCRIPTION OF EMBODIMENTS

Next, the present invention will be described in further detail according to the embodiments. According to the present embodiments, an example is given in which a non-contact power supply apparatus of the present invention is applied to a non-contact power supply apparatus that transmits electric power without contact to an on-board battery that is mounted in an electric car or a hybrid car.

First Embodiment

First, a non-contact power supply apparatus according to a first embodiment will be described with reference to FIG. 1 to FIG. 9.

Figure 1:
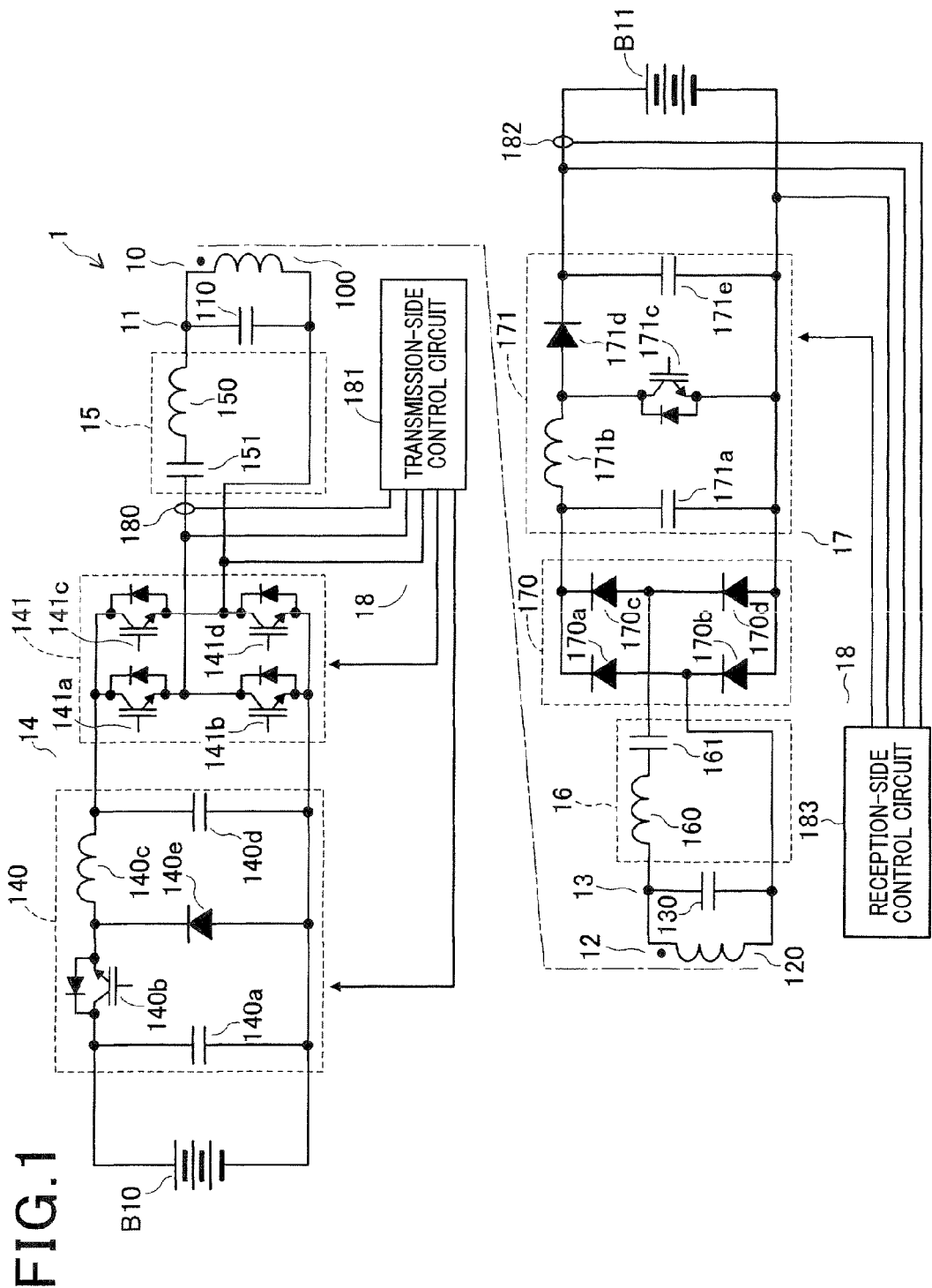
FIG. 1 is a circuit diagram of a non-contact power supply apparatus according to a first embodiment.

FIG. 1 shows a configuration of a non-contact power supply apparatus 1 according to the first embodiment.

The non-contact power supply apparatus 1 shown in FIG. 1 is an apparatus that charges an on-board battery B11 (power supply target) that is mounted in a vehicle by transmitting electric power without contact to the on-board battery B11 from an external battery B10 (direct-current power supply) that is set outside of the vehicle. The non-contact power supply apparatus 1 includes a transmission-side pad 10, a transmission-side resonant circuit 11, a reception-side pad 12, a reception-side resonant circuit 13, a power transmission circuit 14, a transmission-side filter circuit 15, a reception-side filter circuit 16, a power reception circuit 17, and a control circuit 18.

The transmission-side pad 10 is a device that is set in a predetermined position on the ground surface of a parking space and generates alternating flux by being supplied alternating-current power. The transmission-side pad 10 includes a coil 100.

The transmission-side resonant circuit 11 is a circuit that is connected to the transmission-side pad 10 and configures a resonant circuit together with the coil 100 of the transmission-side pad 10. Specifically, the transmission-side resonant circuit 11 is a capacitor 110 that is connected in parallel to the transmission-side pad 10.

The reception-side pad 12 is a device that is set in the bottom portion of the vehicle and disposed so as to oppose the transmission-side pad 10 with space therebetween in the up/down direction, when the vehicle is parked in the parking space. The reception-side pad 12 generates an alternating current through electromagnetic induction by interlinking with the alternating flux generated by the transmission-side pad 10. The reception-side pad 12 includes a coil 120.

The reception-side resonant circuit 13 is a circuit that is connected to the reception-side pad 12 and configures a resonant circuit together with the coil 120 of the reception-side pad 12. Specifically, the reception-side resonant circuit 13 is a capacitor 130 that is connected in parallel to the reception-side pad 12.

The capacities of the capacitors 110 and 130 are set so that, when the transmission-side pad 10 and the reception-side pad 12 are in a predetermined opposing state that serves as a reference, the power factor of the alternating current supplied from the power transmission circuit 14 to the transmission-side pad 10 connected to the transmission-side resonant circuit 11 is 1 or as close to 1 as possible within a selectable range.

The power transmission circuit 14 is a circuit that is connected to the external battery B10, as well as to the transmission-side pad 10 connected to the transmission-side resonant circuit 11, with the transmission-side filter circuit 15 therebetween. The power transmission circuit 14 converts the direct current supplied from the external battery B10 to an alternating current and supplies the alternating current to the transmission-side pad 10 connected to the transmission-side resonant circuit 11. The power transmission circuit includes a transmission-side converter circuit 140 (transmission-side direct-current/direct-current converter circuit) and an inverter circuit 141 (transmission-side direct-current/alternating-current converter circuit).

The transmission-side converter circuit 140 is a circuit that is connected to the external battery B10 and the inverter circuit 141. The transmission-side converter circuit 140 converts the direct current supplied from the external battery B10 to a direct current that has a different voltage and supplies the direct current to the inverter circuit 141. Specifically, the transmission-side converter circuit 140 is a known step-down converter circuit that steps down the voltage of the direct current supplied from the external battery B10 and supplies the direct current to the inverter circuit 141. The transmission-side converter circuit 140 includes a capacitor 140a, an insulated-gate bipolar transistor (IGBT) 140b, a reactor 140c, a capacitor 140d, and a diode 140e.

The capacitor 140a is an element for smoothing the direct current supplied from the external battery B10. One end and the other end of the capacitor 140a are respectively connected to the positive terminal and the negative terminal of the external battery B10.

The IGBT 140b is an element for storing energy in, and discharging energy from, the reactor 140c by being turned ON and OFF. The IGBT 140b includes a freewheeling diode that is connected in inverse parallel between the collector and the emitter. The collector of the IGBT 140b is connected to one end of the capacitor 140a, and the emitter is connected to the reactor 140c. In addition, the gate is connected to the control circuit 18.

The reactor 140c is an element that stores and discharges energy as a result of a current flowing thereto, and also induces voltage. One end of the reactor is connected to the emitter of the IGBT 140b, and the other end is connected to the capacitor 140d.

The capacitor 140d is an element for smoothing the direct current of which the voltage has been stepped down. One end of the capacitor 140d is connected to the other end of the reactor 140c, and the other end is connected to the other end of the capacitor 140a. In addition, the one end and the other end of the capacitor 140d are each connected to the inverter circuit 141.

The diode 140e is an element for sending a current that is generated when the IGBT 140b is turned OFF and the energy stored in the reactor 140c is discharged. The anode of the diode 140e is connected to the other end of the capacitor 140d, and the cathode is connected to one end of the reactor 140c.

The inverter circuit 141 is a circuit that is connected to the transmission-side converter circuit 140, as well as to the transmission-side pad 10 connected to the transmission-side resonant circuit 11, with the transmission-side filter circuit 15 therebetween. The inverter circuit 141 converts the direct current supplied from the transmission-side converter circuit 140 to an alternating current that has a predetermined frequency, and supplies the alternating current to the transmission-side pad 10 connected to the transmission-side resonant circuit 11, via the transmission-side filter circuit 15. The inverter circuit 141 includes IGBTs 141a to 141d.

The IGBTs 141a to 141d are elements for converting a direct current to an alternating current by being turned ON and OFF. The IGBTs 141a to 141d each include a freewheeling diode that is connected in inverse parallel between the collector and the emitter. The IGBTs 141a and 141b and the IGBTs 141c and 141d are each connected in series. Specifically, the emitters of the IGBTs 141a and 141c are respectively connected to the collectors of the IGBTs 141b and 141d. The two pairs of serially connected IGBTs, the IGBTs 141a and 141b and the IGBTs 141c and 141d, are connected to each other in parallel. The collectors of the IGBTs 141a and 141c are connected to one end of the capacitor 140d, and the emitters of the IGBTs 141b and 141d are connected to the other end of the capacitor 140d. The gates of the IGBTs 141a to 141d are each connected to the control circuit 18. The connection point between the IGBTs 141a and 141b and the connection point between the IGBTs 141c and 141d are each connected to the transmission-side filter circuit 15.

The transmission-side filter circuit 15 is a circuit that is connected between the inverter circuit 141 and the transmission-side pad 10 connected to the transmission-side resonant circuit 11. The transmission-side filter circuit 15 removes predetermined frequency components included in the alternating current supplied from the inverter circuit 141. The transmission-side filter circuit 15 includes a reactor 150 and a capacitor 151.

The reactor 150 and the capacitor 151 are elements for configuring a filter circuit. The reactor 150 and the capacitor 151 are connected in series. Specifically, one end of the reactor 150 is connected to one end of the capacitor 151. The other end of the reactor 150 is connected to one end of the coil 100 connected to the capacitor 110. The other end of the capacitor 151 is connected to the connection point between the IGBTs 141a and 141b. In addition, the connection point between the IGBTs 141c and 141d is connected to the other end of the coil 100 connected to the capacitor 110. The transmission-side filter circuit 15 is set so that the impedance at a fundamental frequency of the alternating current supplied from the inverter circuit 141 is smaller than the impedance of the resonant circuit configured by the coil 100 of the transmission-side pad 10 and the transmission-side resonant circuit 11. Specifically, the inductance of the reactor 150 and the capacitance of the capacitor 151 are set to fixed values so that the resonant frequency is the fundamental frequency of the alternating current supplied from the inverter circuit 141.

The reception-side filter circuit 16 is a circuit that is connected between the reception-side pad 12 connected to the reception-side resonant circuit 13 and the power reception circuit 17. The reception-side filter circuit 16 removes predetermined frequency components included in the alternating current supplied from the reception-side pad 12 connected to the reception-side resonant circuit 13. The reception-side filter circuit 16 includes a reactor 160 and a capacitor 161.

The reactor 160 and the capacitor 161 are elements for configuring a filter circuit. The reactor 160 and the capacitor 161 are connected in series. Specifically, one end of the reactor 160 is connected to one end of the capacitor 161. The other end of the reactor 160 is connected to one end of the coil 120 and one end of the capacitor 130. The other end of the capacitor 161 is connected to the power reception circuit 17. In addition, the other end of the coil 120 and the other end of the capacitor 130 is connected to the power reception circuit 17. The reception-side filter circuit 16 is set so that the impedance at a fundamental frequency of the alternating current supplied from the inverter circuit 141 is smaller than the impedance of the resonant circuit configured by the coil 120 of the reception-side pad 12 and the reception-side resonant circuit 13. Specifically, the inductance of the reactor 160 and the capacitance of the capacitor 161 are set to fixed values so that the resonant frequency is the fundamental frequency of the alternating current supplied from the inverter circuit 141.

The power reception circuit 17 is a circuit that is connected to the reception-side pad 12 connected to the reception-side resonant circuit 13, with the reception-side filter circuit 16 therebetween, as well as to the on-board battery B11. The power reception circuit 17 converts the alternating current supplied from the reception-side pad 12 connected to the reception-side resonant circuit 13 to a direct current and supplies the direct current to the on-board battery B11. The power reception circuit 17 includes a rectifier circuit 170 (reception-side alternating-current/direct-current converter circuit) and a reception-side converter circuit 171 (reception-side direct-current/direct-current converter circuit).

The rectifier circuit 170 is a circuit that is connected to the reception-side pad 12 connected to the reception-side resonant circuit 13, with the reception-side filter circuit 16 therebetween, as well as to the reception-side converter circuit 171. The rectifier circuit 170 rectifies the alternating current supplied from the reception-side pad 12 connected to the reception-side resonant circuit 13 and converts the rectified alternating current to a direct current. The rectifier circuit 170 then supplies the direct current to the reception-side converter circuit 171. The rectifier circuit 170 includes diodes 170a to 170d.

The diodes 170a to 170d are elements for rectifying the alternating current. The diodes 170a and 170b and the diodes 170c and 170d are each connected in series. Specifically, the anodes of the diodes 170a and 170c are respectively connected to the cathodes of the diodes 170b and 170d. The two pairs of serially connected diodes, diodes 170a and 170b and diodes 170c and 170d, are connected to each other in parallel. The connection point between the diodes 170a and 170b is connected to the other end of the coil 120 connected to the capacitor 130. The connection point between the diodes 170c and 170d are connected to the other end of the capacitor 161. In addition, the cathodes of the diodes 170a and 170c and the anodes of the diodes 170b and 170d are each connected to the reception-side converter circuit 171.

The reception-side converter circuit 171 is a circuit that is connected to the rectifier circuit 170 and the on-board battery B11. The reception-side converter circuit 171 converts the direct current supplied from the rectifier circuit 170 to a direct current that has a different voltage and supplies the direct current to the on-board battery B11. Specifically, the reception-side converter circuit 171 is a known step-up converter circuit that steps up the voltage of the direct current supplied from the rectifier circuit 170 and supplies the direct current to the on-board battery B11. The reception-side converter circuit 171 includes a capacitor 171a, a reactor 171b, an IGBT 171c, a diode 171d, and a capacitor 171e.

The capacitor 171a is an element for smoothing the direct current supplied from the rectifier circuit 170. One end of the capacitor 171a is connected to the cathodes of the diodes 170a and 170c, and the other end is connected to the anodes of the diodes 170b and 170d.

The reactor 171b is an element that stores and discharges energy as a result of a current flowing thereto, and also induces voltage. One end of the reactor 171b is connected to one end of the capacitor 171a, and the other end is connected to the IGBT 171c.

The IGBT 171c is an element for storing energy in, and discharge energy from, the reactor 171b by being turned ON and OFF. The IGBT 171c includes a freewheeling diode that is connected in inverse parallel between the collector and the emitter. The collector of the IGBT 171c is connected to the other end of the reactor 171b, and the emitter is connected to the other end of the capacitor 171a. In addition, the gate is connected to the control circuit 18.

The diode 171d is an element that is used to send current generated when the IGBT 171c is turned OFF and the energy collected in the reactor 171b is discharged. The anode of the diode 171d is connected to the other end of the reactor 171b, and the cathode is connected to the capacitor 171e.

The capacitor 171e is an element for smoothing the direct current of which the voltage has been stepped up. One end of the capacitor 171e is connected to the cathode of the diode 171d, and the other end is connected to the other end of the capacitor 171a. In addition, the one end and the other end of the capacitor 171e are respectively connected to the positive terminal and the negative terminal of the on-board battery B11.

The control circuit 18 is a circuit that is connected to both the power transmission circuit 14 and the power reception circuit 17. The control circuit 18 controls the power transmission circuit 14 and the power reception circuit 17 to transmit electric power from the external battery B10 to the on-board battery B11. Specifically, the control circuit 18 is a circuit that controls the alternating-current voltage supplied from the power transmission circuit 14 to the transmission-side pad 10 connected to the transmission-side resonant circuit 11 and the alternating-current voltage supplied from the reception-side pad 10 connected to the reception-side resonant circuit 13 to the power reception circuit 17, so that the power factor of the alternating current supplied from the power transmission circuit 14 to the transmission-side pad 10 connected to the transmission-side resonant circuit 11 and the direct-current power supplied from the power reception circuit 17 to the on-board battery B11 are respectively set to target values. The control circuit 18 includes a transmission-side current sensor 180, a transmission-side control circuit 181, a reception-side current sensor 182, and a reception-side control circuit 183.

The transmission-side current sensor 180 is an element that detects the alternating current supplied from the inverter circuit 141 to the transmission-side pad 10 connected to the transmission-side resonant circuit 11, and outputs the detection result. The transmission-side current sensor 180 is provided on wiring connecting the inverter circuit 141 and the transmission-side filter circuit 15, so as to be clamped onto the wiring. The output end of the transmission-side current sensor 180 is connected to the transmission-side control circuit 181.

The transmission-side control circuit 181 is a circuit that is connected to the power transmission circuit 14 and the transmission-side current sensor 180. The transmission-side control circuit 181 uses wireless communication to transmit to and receive from the reception-side control circuit 183, information necessary for control. The transmission-side control circuit 181 thereby controls the transmission-side converter circuit 140 and the inverter circuit 141. The transmission-side control circuit 181 determines the power factor of the alternating current supplied from the inverter circuit 141 to the transmission-side pad 10 connected to the transmission-side resonant circuit 11, based on the detection result of the alternating-current voltage supplied from the inverter circuit 141 to the transmission-side pad 10 connected to the transmission-side resonant circuit 11 and the detection result from the transmission-side current sensor 180. The transmission-side control circuit 181 then transmits the determined power factor to the reception-side control circuit 183. Then, the transmission-side control circuit 181 controls the alternating-current voltage supplied from the inverter circuit 141 to the transmission-side pad 10 connected to the transmission-side resonant circuit 11 so that the power factor of the alternating current supplied from the inverter circuit 141 to the transmission-side pad 10 connected to the transmission-side resonant circuit 11 and the direct-current power supplied from the reception-side converter circuit 171 to the on-board battery B11 that has been received from the reception-side control circuit 183 are respectively set to the target values. Specifically, the transmission-side control circuit 181 controls the alternating-current voltage supplied from the inverter circuit 141 to the transmission-side pad 10 connected to the transmission-side resonant circuit 11 by controlling the power transmission circuit 14.

More specifically, the direct-current voltage supplied to the inverter circuit 141 is controlled by switching of the IGBT 140b being controlled. In addition, switching of the IGBTs 141a to 141d is controlled so as to actualize 180-degree rectangular wave energization. In other words, rather than the alternating-current voltage supplied from the inverter circuit 141 to the transmission-side pad 10 connected to the transmission-side resonant circuit 11 being controlled by the inverter circuit 141 being controlled, the alternating-current voltage supplied from the inverter circuit 141 to the transmission-side pad 10 connected to the transmission-side resonant circuit 11 is controlled by the direct-current voltage supplied to the inverter circuit 141 being controlled. The transmission-side control circuit 181 is connected to the respective gates of the IGBTs 141a to 141d. In addition, the transmission-side control circuit 181 is connected to each of the connection point between the IGBTs 141a and 141b and the connection point between the IGBTs 141c and 141d. Furthermore, the transmission-side control circuit 181 is also connected to the output end of the transmission-side current sensor 180.

The reception-side control circuit 182 is an element that detects the direct current supplied from the reception-side converter circuit 171 to the on-board battery B11, and outputs the detection result. The reception-side control circuit 182 is provided on wiring connecting the reception-side converter circuit 171 and the on-board battery B11, so as to be clamped onto the wiring. The output end of the reception-side control circuit 182 is connected to the reception-side control circuit 183.

The reception-side control circuit 183 is a circuit that is connected to the power reception circuit 17 and the reception-side current sensor 182. The reception-side control circuit 183 uses wireless communication to transmit to and receive from the transmission-side control circuit 181, information necessary for control. The reception-side control circuit 183 thereby controls the power reception circuit 17. The reception-side control circuit 183 determines the direct-current power supplied from the reception-side converter circuit 171 to the on-board battery B11, based on the detection result of the voltage supplied from the reception-side converter circuit 171 to the on-board battery B11 and the detection result from the reception-side current sensor 181. The reception-side control circuit 183 then transmits the determined direct-current power to the transmission-side control circuit 181. Then, the reception-side control circuit 183 controls the alternating-current voltage supplied from the reception-side pad 12 connected to the reception-side resonant circuit 13 to the power reception circuit 17 so that the power factor of the alternating current supplied from the inverter circuit 141 to the transmission-side pad 10 connected to the transmission-side resonant circuit 11 that has been received from the transmission-side control circuit 181 and the direct-current power supplied from the reception-side converter circuit 171 to the on-board battery B11 are respectively set to the target values. Specifically, the reception-side control circuit 183 controls the alternating-current voltage supplied from the reception-side pad 12 connected to the reception-side resonant circuit 13 to the power reception circuit 17 by controlling the direct-current voltage supplied from the rectifier circuit 170 to the reception-side converter circuit 171.

More specifically, the direct-current voltage supplied from the rectifier circuit 170 to the reception-side converter circuit 171 is controlled by the reception-side converter circuit 171 being controlled. Still more specifically, the direct-current voltage supplied to the reception-side converter circuit 171 is controlled by the switching of the IGBT 171c being controlled. The reception-side control circuit 183 is connected to the gate of the IGBT 171c. In addition, the reception-side control circuit 183 is connected to each of the one end and the other end of the capacitor 171e. Furthermore, the reception-side control circuit 183 is connected to the output end of the reception-side current sensor 182.

Next, the operation of the non-contact power supply apparatus will be described with reference to FIG. 1. The transmission-side converter circuit 140, the inverter circuit 141, and the reception-side converter circuit 171 are known circuits. Therefore, description of the detailed operations of the IGBTs will be omitted.

When the vehicle is parked in the parking space, the coil 100 of the transmission-side pad 10 and the coil 120 of the reception-side pad 12, shown in FIG. 1, oppose each other within a predetermined range in the up/down direction, the front/rear direction, and the left/right direction. When a charge start button (not shown) is pressed in this state and an instruction to start charging is issued, the operation of the non-contact power supply apparatus 1 starts.

The transmission-side converter circuit 140 is controlled by the transmission-side control circuit 181 to step down the voltage of the direct current supplied from the external battery B10 by switching the IGBT 140b, and supplies the direct current to the inverter circuit 141. The inverter circuit 141 is controlled by the transmission-side control circuit 181 to convert the direct current supplied from the transmission-side converter circuit 140 to a current that has a predetermined frequency, such as several tens of kHz, by switching the IGBTs 141a to 141d at a predetermined timing, and supplies the converted direct current to the transmission-side pad 10 connected to the transmission-side resonant circuit 11, via the transmission-side filter circuit 15. The transmission-side filter circuit 15 removes predetermined frequency components included in the alternating current supplied from the inverter circuit 141. Specifically, the transmission-side filter circuit 15 converts the rectangular-wave alternating-current voltage to a sine-wave alternating-current voltage and supplies the converted alternating-current voltage to the transmission-side pad 10 connected to the transmission-side resonant circuit 11. The transmission-side pad 10 connected to the transmission-side resonant circuit 11 generates an alternating flux by being supplied the alternating-current power from the inverter circuit 141.

The reception-side pad 12 connected to the reception-side resonant circuit 13 generates an alternating current through electromagnetic induction by interlinking with the alternating flux generated by the transmission-side pad 10. The reception-side filter circuit 16 removes predetermined frequency components included in the alternating current supplied to the rectifier circuit 170. Specifically, reception-side filter circuit 16 converts the sine-wave alternating-current voltage supplied from the reception-side pad 12 connected to the reception-side resonant circuit 13 to a rectangular-wave alternating-current voltage and supplies the converted alternating-current voltage to the rectifier circuit 170. The rectifier circuit 170 rectifies the alternating current supplied from the reception-side pad 12 connected to the reception-side resonant circuit 13 via the reception-side filter circuit 16, and converts the rectified alternating current to direct current. The rectifier circuit 170 then supplies the direct current to the reception-side converter circuit 171. The reception-side converter circuit 171 is controlled by the reception-side control circuit 183 to step up the voltage of the direct current supplied from the rectifier circuit 170 by switching the IGBT 171c. The reception-side converter circuit 171 then supplies the direct current to the on-board battery B11, thereby charging the on-board battery B11. In this way, electric power can be transmitted without contact from the external battery B10 to the on-board battery B11.

The transmission-side control circuit 181 determines the power factor of the alternating current supplied from the inverter circuit 141 to the transmission-side pad 10 connected to the transmission-side resonant circuit 11, based on the detection result of the voltage supplied from the inverter circuit 141 to the transmission-side pad 10 connected to the transmission-side resonant circuit 11 and the detection result from the transmission-side current sensor 180. The transmission-side control circuit 181 then transmits the determined power factor to the reception-side control circuit 183. On the other hand, the reception-side control circuit 183 determines the direct-current power supplied from the reception-side converter circuit 171 to the on-board battery B11, based on the detection result of the voltage supplied from the reception-side converter circuit 171 to the on-board battery B11 and the detection result of the reception-side current sensor 182. The reception-side control circuit 183 then transmits the determined direct-current power to the transmission-side control circuit 181.

The transmission-side control circuit 181 controls the alternating-current voltage supplied from the inverter circuit 141 to the transmission-side pad 10 connected to the transmission-side resonant circuit 11 so that the power factor of the alternating current supplied from the inverter circuit 141 to the transmission-side pad 10 connected to the transmission-side resonant circuit 11 and the direct-current power supplied from the reception-side converter circuit 171 to the on-board battery B11 that has been received from the reception-side control circuit 183 are respectively set to the target values. Specifically, the transmission-side control circuit 181 controls the direct-current voltage supplied to the inverter circuit 141 by controlling the switching of the IGBT 140b, and controls the switching of the IGBTs 141a to 141d so as to achieve 180-degree rectangular wave energization.

On the other hand, the reception-side control circuit 183 controls the alternating-current voltage supplied from the reception-side pad 12 connected to the reception-side resonant circuit 13 to the power reception circuit 17 so that the power factor of the alternating current supplied from the inverter circuit 141 to the transmission-side pad 10 connected to the transmission-side resonant circuit 11 that has been received from the transmission-side control circuit 181 and the direct-current power supplied from the reception-side converter circuit 171 to the on-board battery B11 are respectively set to target values. Specifically, the reception-side control circuit 183 controls the direct-current voltage supplied from the rectifier circuit 170 to the reception-side converter circuit 171 by controlling the reception-side converter circuit 171. As a result, the reception-side control circuit 183 controls the alternating-current voltage supplied from the reception-side pad 12 connected to the reception-side resonant circuit 13 to the power reception circuit 17. More specifically, the reception-side control circuit 183 controls the direct-current voltage supplied to the reception-side converter circuit 171 by controlling the switching of the IGBT 171c, and controls the alternating-current voltage supplied from the reception-side pad 12 connected to the reception-side resonant circuit 13 to the power reception circuit 17. The alternating-current power supplied from the reception-side pad 12 connected to the reception-side resonant circuit 13 to the power reception circuit 17 is affected by the impedances of the transmission-side pad 10, the reception-side pad 12, and the reception-side resonant circuit 13. Therefore, control of the reception-side converter circuit 171 results in controlling the input voltage to the reception-side converter circuit 171, that is, the output voltage from the rectifier circuit 170, which leads to control of the alternating-current voltage supplied from the reception-side pad 12 connected to the reception-side resonant circuit 13

The positional relationship of the transmission-side pad 10 and the reception-side pad 12 changes each time parking is performed. A reason for this is that the parking position changes due to driver operations, each time parking is performed. In addition, the positional relationship of the transmission-side pad 10 and the reception-side pad 12 also changes during parking. A reason for this is that the height from the ground surface to the bottom portion of the vehicle changes as a result of cargo being loaded and unloaded and people getting on and off.

Figure 2:
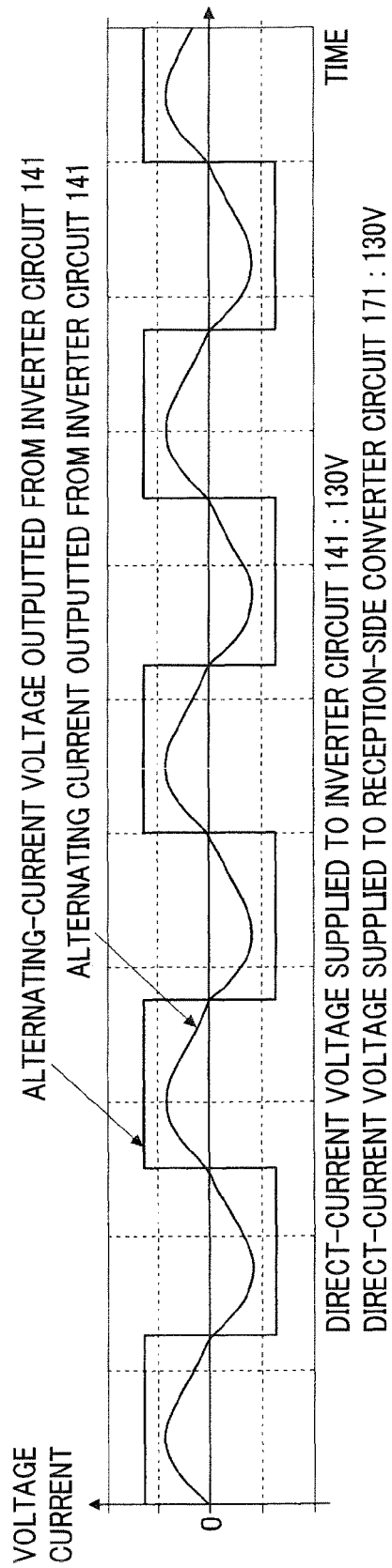
FIG. 2 is a waveform diagram of an alternating current that is supplied from an inverter circuit to a transmission-side pad connected to a transmission-side resonant circuit, when the coupling coefficient is 0.13, according to the first embodiment.
Figure 3:
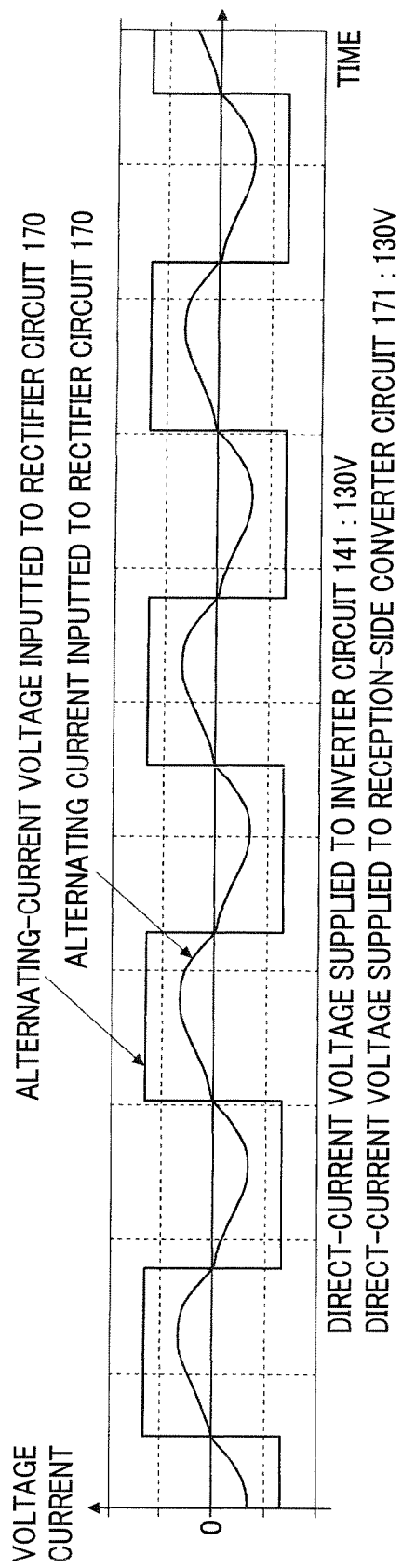
FIG. 3 is a waveform diagram of an alternating current supplied from a reception-side pad connected to a reception-side resonant circuit to a rectifier circuit, when the coupling coefficient is 0.13, according to the first embodiment.

As shown in FIG. 2 and FIG. 3, when the transmission-side pad 10 and the reception-side pad 12 are in a predetermined positional relationship that serves as reference and the coupling coefficient is, for example, 0.13, as a result of the direct-current voltage supplied from the transmission-side converter circuit 140 to the inverter circuit 141 being controlled to 130 V and the direct-current voltage supplied from the rectifier circuit 170 to the reception-side converter circuit 171 being controlled to 130 V, the alternating-current voltage supplied from the inverter circuit 141 to the transmission-side pad 10 connected to the transmission-side resonant circuit 11 and the alternating-current voltage supplied from the reception-side pad 12 connected to the reception-side resonant circuit 13 to the rectifier circuit 170 can be controlled. The power factor can be controlled to be substantially 1, and the direct-current power supplied from the reception-side converter circuit 171 to the on-board battery B11 can be controlled to 1 kW.

Figure 4:
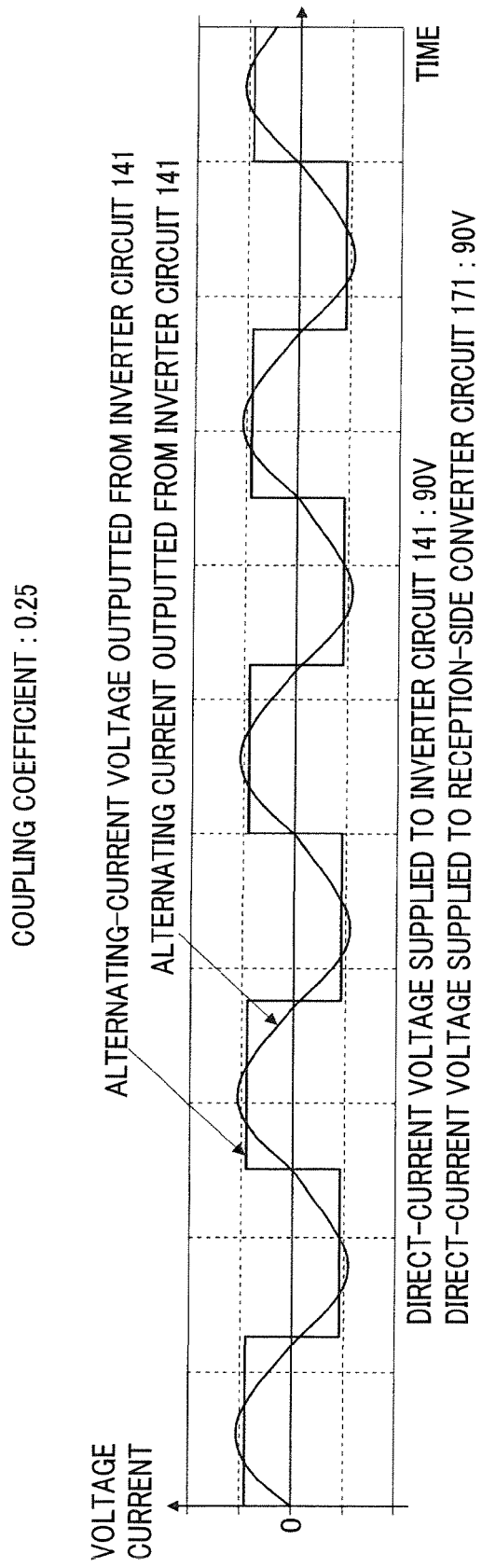
FIG. 4 is a waveform diagram of an alternating current that is supplied from an inverter circuit to a transmission-side pad connected to a transmission-side resonant circuit, when the coupling coefficient is 0.25, according to the first embodiment.
Figure 5:
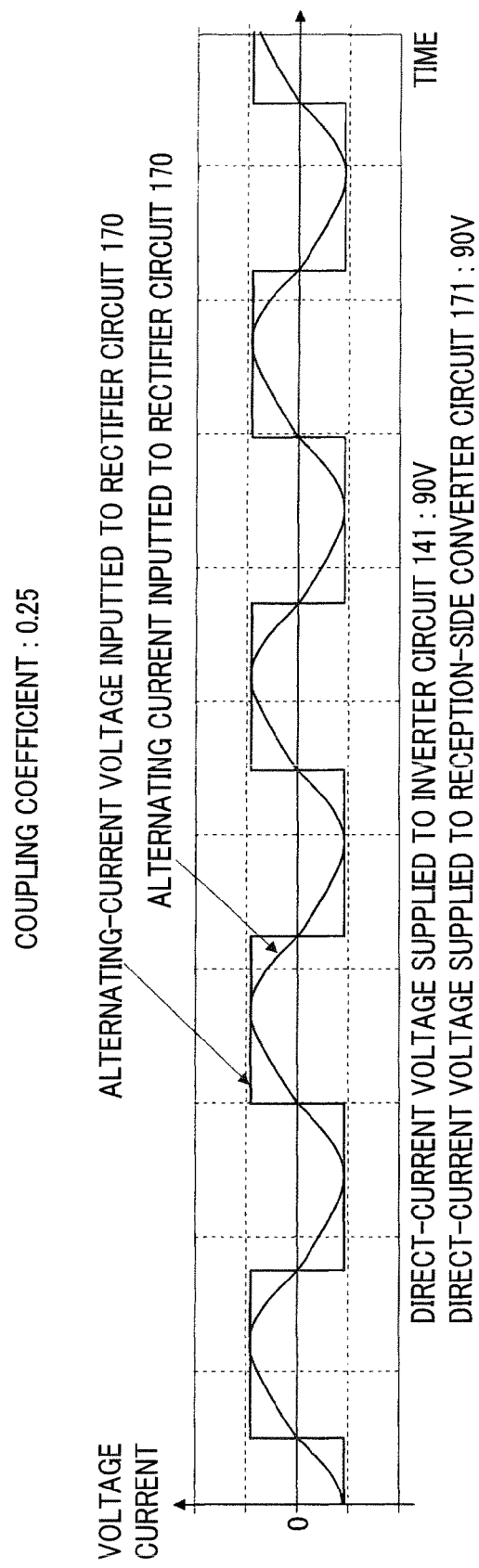
FIG. 5 is a waveform diagram of an alternating current supplied from a reception-side pad connected to a reception-side resonant circuit to a rectifier circuit, when the coupling coefficient is 0.25, according to the first embodiment.

As shown in FIG. 4 and FIG. 5, when the positional relationship between the transmission-side pad 10 and the reception-side pad 12 changes and the coupling coefficient changes from 0.13 to, for example, 0.25, as a result of the direct-current voltage supplied from the transmission-side converter circuit 140 to the inverter circuit 141 being controlled to 90 V and the direct-current voltage supplied from the rectifier circuit 170 to the reception-side converter circuit 171 being controlled to 90 V, the alternating-current voltage supplied from the inverter circuit 141 to the transmission-side pad 10 connected to the transmission-side resonant circuit 11 and the alternating-current voltage supplied from the reception-side pad 12 connected to the reception-side resonant circuit 13 to the rectifier circuit 170 can be controlled. The power factor can be controlled to substantially 1, and the direct-current power supplied from the reception-side converter circuit 171 to the on-board battery B11 can be controlled to 1 kW. Even when the coupling coefficient changes from 0.13 to 0.25, direct-current power of 1 kW, which is the target, can be supplied to the on-board battery B11 without reduction in power factor, as a result of the direct-current voltage supplied from the transmission-side converter circuit 140 to the inverter circuit 141 and the direct-current voltage supplied from the rectifier circuit 170 to the reception-side converter circuit 171 being controlled.

At the start of operation of the non-contact power supply apparatus 1, the control circuit 18 increases the direct-current voltage supplied from the transmission-side converter circuit 140 to the inverter circuit 141 and the direct-current voltage supplied from the rectifier circuit 170 to the reception-side converter circuit 171, in a ramp-like manner from, for example, 0 V or a sufficiently low voltage. The control circuit 18 sets the direct-current power supplied to the on-board battery B11 as target power. Specifically, the control circuit 18 increases a voltage command value in a ramp-like manner. In addition, the control circuit 18 finely adjusts the direct-current voltage supplied from the transmission-side converter 140 to the inverter circuit 141 and the direct-current voltage supplied from the rectifier circuit 170 to the reception-side converter circuit 171 so that the power factor of the alternating current outputted from the power transmission circuit 14 is the target value. This control can be performed using a proportional-integral (PI) controller. In a similar manner, when the target value of the direct-current power supplied to the on-board battery B11 changes, the direct-current voltage supplied from the transmission-side converter circuit 140 to the inverter circuit 141 and the direct-current voltage supplied from the rectifier circuit 170 to the reception-side converter circuit 171 are stepped up or down. Then, when the direct-current power supplied to the on-board battery B11 becomes the target value, the direct-current supplied from the transmission-side converter circuit 140 to the inverter circuit 141 and the direct-current voltage supplied from the rectifier circuit 170 to the reception-side converter circuit 171 are finely adjusted so that the power factor of the alternating current outputted from the inverter circuit 141 becomes the target value. This also similarly applies when the coupling coefficient changes.

Figure 6:
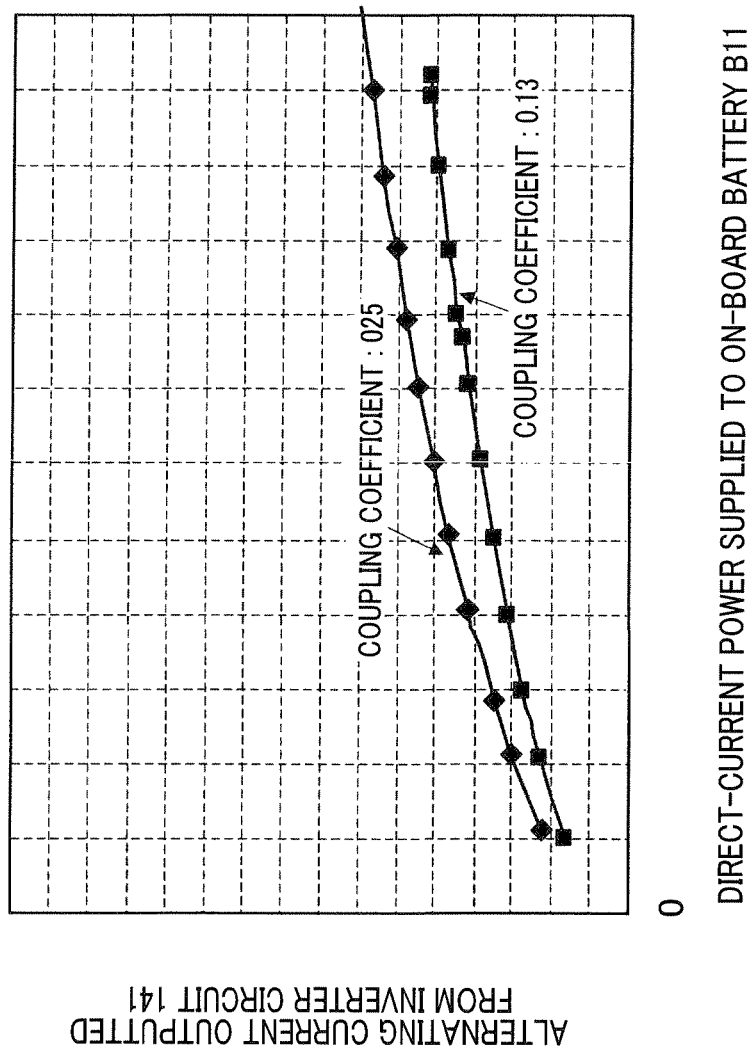
FIG. 6 is a graph that indicates the relationship between direct-current power supplied to an on-board battery of the non-contact power supply apparatus and the alternating current supplied from the inverter circuit to the transmission-side pad connected to the transmission-side resonant circuit, according to the first embodiment.
Figure 7:
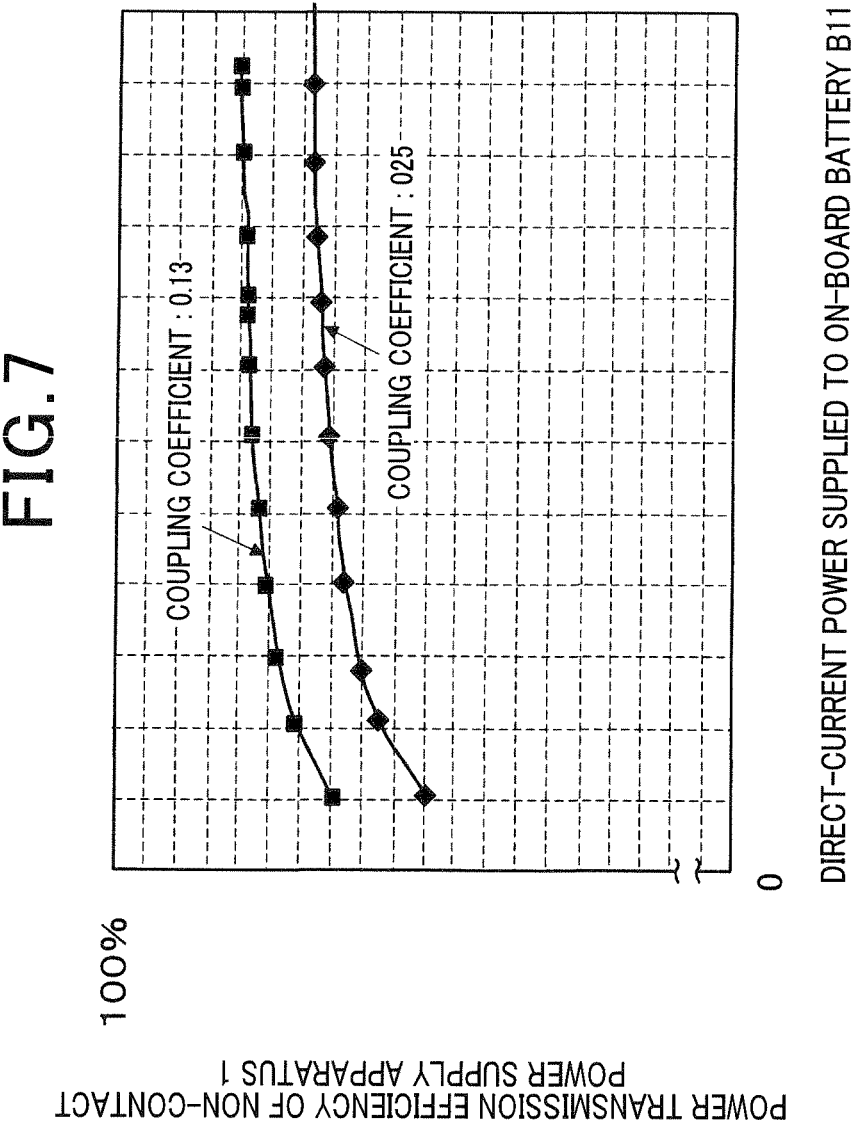
FIG. 7 is a graph that indicates the relationship between the direct-current power supplied to the on-board battery of the non-contact power supply apparatus and power transmission efficiency.

The non-contact power supply apparatus 1 can maintain the power factor at substantially 1, even when the coupling coefficient of the transmission-side pad 10 and the reception-side pad 12 changes from 0.13 to 0.25. Therefore, as shown in FIG. 6, increase in the alternating current supplied from the inverter circuit 141 to the transmission-side pad 10 connected to the transmission-side resonant circuit 11 can be suppressed regardless of the value of the direct-current power supplied to the on-board battery B11. As a result, as shown in FIG. 7, decrease in power transmission efficiency of the non-contact power supply apparatus 1 can be suppressed regardless of the value of the direct-current power supplied to the on-board battery B11. The alternating current becomes larger and power transmission efficiency decreases when the coupling coefficient is 0.25, compared to when the coupling coefficient is 0.13. However, as shown in FIG. 2 to FIG. 5, a reason for this is the increase in current accompanying the decrease in voltage at the operation point of the circuit and the accompanying increase in loss in each section of the circuit, rather than deterioration of the power factor. The vertical axis and the horizontal axis in FIG. 6, as well as the horizontal axis in FIG. 7 indicate current and power in dimensionless quantities.

Next, effects of the first embodiment will be described.

According to the first embodiment, the control circuit 18 controls the alternating-current voltage supplied from the power transmission circuit 14 to the transmission-side pad 10 connected to the transmission-side resonant circuit 11 and the alternating-current voltage supplied from the reception-side pad 12 connected to the reception-side resonant circuit 13 to the power reception circuit 17 so that the power factor of the alternating current supplied from the power transmission circuit 14 to the transmission-side pad 10 connected to the transmission-side resonant circuit 11 and the direct-current power supplied from the power reception circuit 17 to the on-board battery B11 are respectively set to target values. The control circuit 18 thereby transmits electric power from the external battery B10 to the on-board battery B11. Therefore, as described above, change in power factor can be suppressed even when the coupling coefficient of the transmission-side pad 10 and the reception-side pad 12 changes, and predetermined electric power can be transmitted from the external battery B10 to the on-board battery B11. In addition, because change in the fundamental frequency of the alternating current outputted from the power transmission circuit 14 does not occur in accompaniment, the frequency range used by the non-contact power supply apparatus 1 can be minimized.

According to the first embodiment, the control circuit 18 controls the alternating-current voltage supplied from the power transmission circuit 14 to the transmission-side pad 10 connected to the transmission-side resonant circuit 11 and the direct-current voltage supplied from the rectifier circuit 170 to the reception-side converter circuit 171 so that the power factor of the alternating current supplied from the power transmission circuit 14 to the transmission-side pad 10 connected to the transmission-side resonant circuit 11 and the direct-current power supplied from the power reception circuit 17 to the on-board battery B11 are respectively set to target values. The control circuit 18 thereby transmits electric power from the external battery B10 to the on-board battery B11. Therefore, as described above, change in power factor can be suppressed even when the coupling coefficient of the transmission-side pad 10 and the reception-side pad 12 changes, and predetermined electric power can be transmitted from the external battery B10 to the on-board battery B11.

According to the first embodiment, the control circuit 18 controls the alternating-current voltage supplied from the power transmission circuit 14 to the transmission-side pad 10 connected to the transmission-side resonant circuit 11 by controlling the power transmission circuit 14. The control circuit 18 also controls the direct-current voltage supplied from the rectifier circuit 170 to the reception-side converter circuit 171 by controlling the reception-side converter circuit 171. Therefore, the alternating-current voltage supplied from the inverter circuit 141 to the transmission-side pad 10 connected to the transmission-side resonant circuit 11 and the direct-current voltage supplied from rectifier circuit 170 to the reception-side converter circuit 171 can be controlled with reliability.

According to the first embodiment, the control circuit 18 controls the alternating-current voltage supplied from the power transmission circuit 14 to the transmission-side pad 10 connected to the transmission-side resonant circuit 11 by controlling the transmission-side converter circuit 140. Therefore, the alternating-current voltage supplied from the inverter circuit 141 to the transmission-side pad 10 connected to the transmission-side resonant circuit 11 can be controlled with reliability.

Figure 8:
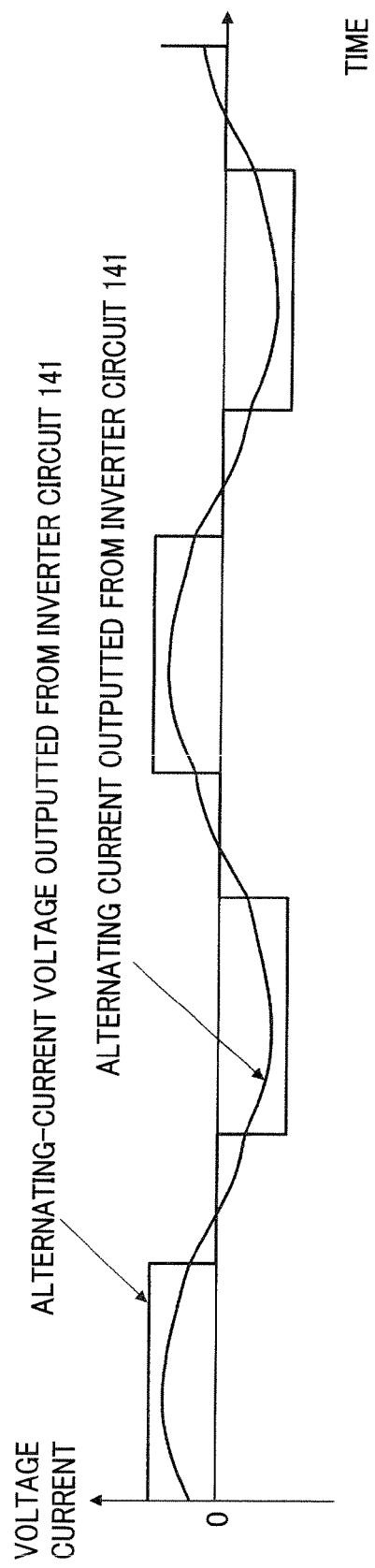
FIG. 8 is a waveform diagram of the alternating current supplied from the inverter circuit to the transmission-side pad connected to the transmission-side resonant circuit, when the inverter circuit is controlled by a pulse width modulation method.

When the control circuit 18 controls the inverter circuit 141 by the pulse width modulation method, voltage is switched while the current is flowing, as shown in FIG. 8. In other words, the control circuit 18 performs switching of the IGBTs 141a to 141d while the current is flowing. Therefore, switching loss in the IGBTs 141a to 141d increases. However, according to the first embodiment, the control circuit 18 controls the inverter circuit 141 based on 180-degree rectangular wave energization. Therefore, as shown in FIG. 2 and FIG. 3, voltage is switched in a state in which the current is sufficiently low and substantially near zero. In other words, the control circuit 18 performs switching of the IGBTs 141a to 141d in a state in which the current is sufficiently low and substantially near zero. Therefore, switching loss in the IGBTs 141a to 141d can be suppressed. As a result, power transmission efficiency of the non-contact power supply apparatus 1 can be improved.

According to the first embodiment, the transmission-side resonant circuit 11 and the reception-side resonant circuit 13 are capacitors 110 and 130 that are respectively connected in parallel to the coils 100 and 120, and have fixed capacities. Therefore, the resonant circuits can be configured with certainty, together with the coils 100 and 120. In addition, compared to when the power factor is controlled by a capacitor being provided with a variable capacitance mechanism, reliability of the element can be improved and the resonant circuit can be configured with further reliability.

According to the first embodiment, the non-contact power supply apparatus 1 includes the transmission-side filter circuit 15 and the reception-side filter circuit 16. The transmission-side filter circuit 15 is set so that the impedance at the fundamental frequency of the alternating current supplied from the power transmission circuit 14 is smaller than the impedance of the resonant circuit configured by the coil 100 and the transmission-side resonant circuit 11. The reception-side filter circuit 16 is set so that the impedance at the fundamental frequency of the alternating current supplied from the power transmission circuit 14 is smaller than the impedance of the resonant circuit configured by the coil 120 and the reception-side resonant circuit 13. Therefore, loss in the transmission-side filter circuit 15 and the reception-side filter circuit 16 can be suppressed. As a result, power transmission efficiency of the non-contact power supply apparatus 1 can be improved. In addition, adverse effects of impedance on the transmission-side filter circuit 15 and the reception-side filter circuit 16 can be suppressed. The alternating-current voltage supplied from the inverter circuit 141 to the transmission-side pad 10 connected to the transmission-side resonant circuit 11 and the alternating-current voltage supplied from the reception-side pad 12 connected to the reception-side resonant circuit 13 to the power reception circuit 17 can be controlled with further certainty.

According to the first embodiment, the transmission-side filter circuit 15 and the reception-side filter circuit 16 are composed of the serially connected reactors 150 and 160 that have a fixed inductance and capacitors 151 and 161 that have a fixed capacitance. The resonant frequency is set to the fundamental frequency of the alternating current supplied from the power transmission circuit 14. Therefore, loss in the transmission-side filter circuit 15 and the reception-side filter circuit 16 can be suppressed with certainty. As a result, power transmission efficiency of the non-contact power supply apparatus 1 can be improved with certainty. In addition, compared to when the power factor is controlled by the inductance and the capacitor being provided with variable mechanisms for inductance and capacitance, reliability of the element can be improved and the filter circuit can be configured with further certainty. Furthermore, as a result of impedance increasing at a frequency other than in the proximity of the resonant frequency, unnecessary frequency components, such as harmonic components, can be reduced, and the frequency range used by the non-contact power supply apparatus 1 can be minimized.

According to the first embodiment, the control circuit 18 includes the transmission-side control circuit 181 that controls the power transmission circuit 14 and the reception-side control circuit 183 that controls the power reception circuit 17. The transmission-side control circuit 181 and the reception-side control circuit 183 transmit and receive information required for control using wireless communication. Therefore, the power transmission circuit 14 and the power reception circuit 17 can be controlled with certainty.

According to the first embodiment, an example is given in which the transmission-side control circuit 181 determines the power factor based on the detection results of the alternating-current voltage and the alternating current supplied from the inverter circuit 141 to the transmission-side pad 10 connected to the transmission-side resonant circuit 11. However, this is not limited thereto. The transmission-side control circuit 181 may determine the power factor based on the switching timings of the IGBTs 141a to 141d.

Second Embodiment

Next, a non-contact power supply apparatus according to a second embodiment will be described with reference to FIG. 10 to FIG. 13.

In the non-contact power supply apparatus according to the second embodiment and subsequent embodiments, constituent elements that are the same or equivalent to those in the above-described non-contact power supply apparatus 1 according to the first embodiment are given the same reference numbers. Descriptions thereof are omitted or simplified.

The non-contact power supply apparatus according to the second embodiment is that in which the reception-side filter circuit has been eliminated and the configuration of the rectifier circuit has been partially modified in the non-contact power supply apparatus according to the first embodiment.

First, a configuration of a non-contact power supply apparatus 2 according to the second embodiment will be described with reference to FIG. 9.

Figure 9:
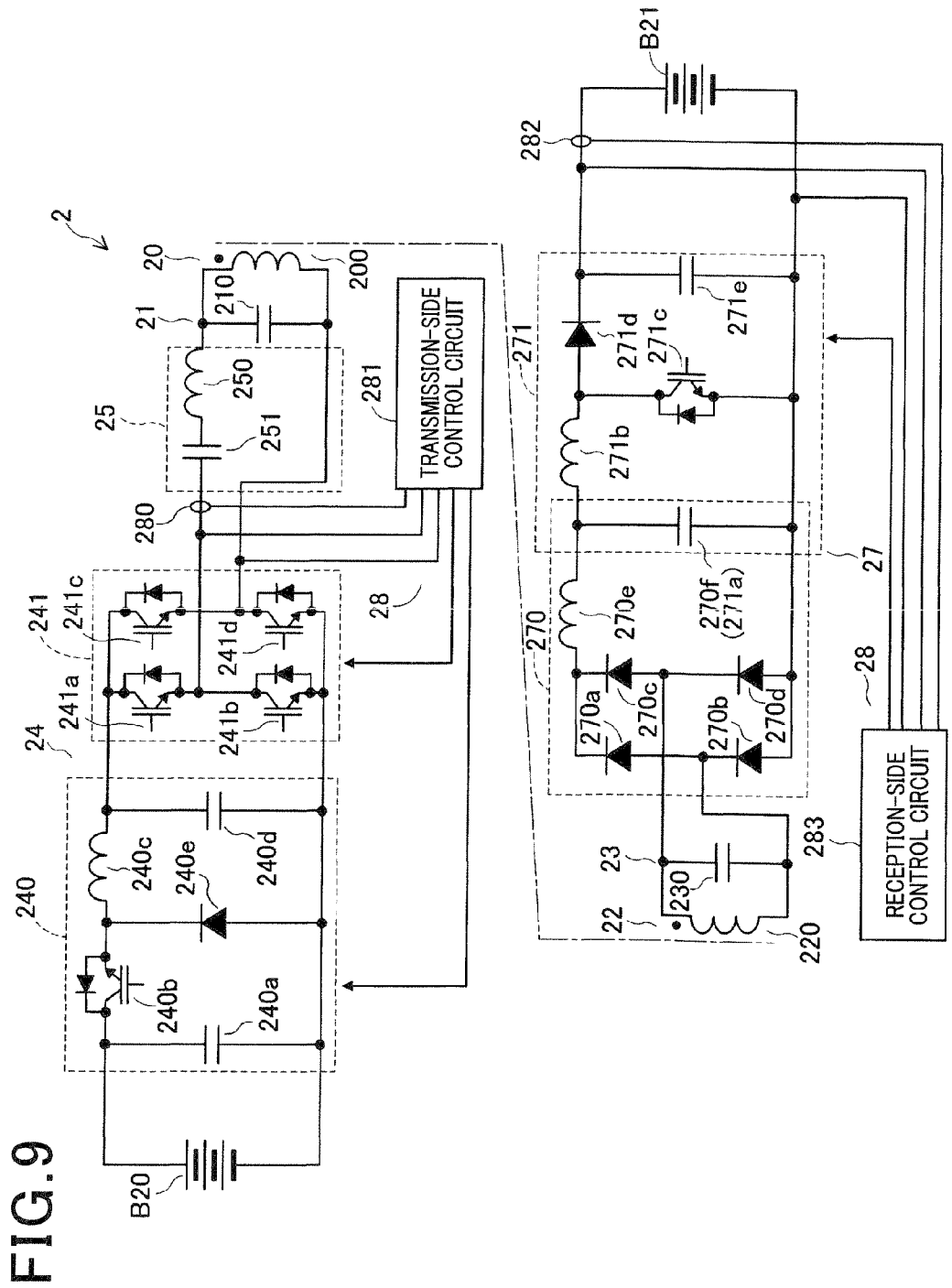
FIG. 9 is a circuit diagram of a non-contact power supply apparatus according to a second embodiment.

In a manner similar to the non-contact power supply apparatus 1 according to the first embodiment, the non-contact power supply apparatus 2 shown in FIG. 9 is an apparatus that charges an on-board battery B21 (power supply target) by transmitting electric power without contact to the on-board battery B21 from an external battery B20 (direct-current power supply). The non-contact power supply apparatus 2 includes a transmission-side pad 20, a transmission-side resonant circuit 21, a reception-side pad 22, a reception-side resonant circuit 23, a power transmission circuit 24, a transmission-side filter circuit 25, a power reception circuit 27, and a control circuit 28.

The transmission-side pad 20 includes a coil 200. The transmission-side resonant circuit 21 is provided as a capacitor 210. The reception-side pad 22 includes a coil 220. The reception-side resonant circuit 23 is provided as a capacitor 230. The transmission-side pad 20, the transmission-side resonant circuit 21, the reception-side pad 22, and the reception-side resonant circuit 23 have the same configurations as the transmission-side pad 10, the transmission-side resonant circuit 11, the reception-side pad 12, and the reception-side resonant circuit 13 according to the first embodiment.

The power transmission circuit 24 includes a transmission-side converter circuit 240 (transmission-side direct-current/direct-current converter circuit) and an inverter circuit 241 (transmission-side direct-current/alternating-current converter circuit). The transmission-side converter circuit 240 includes a capacitor 240a, an IGBT 240b, a reactor 240c, a capacitor 240d, and a diode 240e. The inverter circuit 241 includes IGBTs 241a to 241d. The power transmission circuit 24 has the same configuration as the power transmission circuit 14 according to the first embodiment.

The transmission-side filter circuit 25 includes a reactor 250 and a capacitor 251, and has the same configuration as the transmission-side filter circuit 15 according to the first embodiment. However, the non-contact power supply apparatus 2 does not include a circuit that corresponds to the reception-side filter circuit 16 according to the first embodiment.

The power reception circuit 27 includes a rectifier circuit 270 (reception-side alternating-current/direct-current converter circuit) and a reception-side converter circuit 271 (reception-side direct-current/direct-current converter circuit).

The rectifier circuit 270 includes diodes 270a to 270d, a reactor 270e, and a capacitor 270f. The diodes 270a to 270d have the same configurations as the diodes 170a to 170d according to the first embodiment. The reactor 270e and the capacitor 270f are elements for configuring a filter circuit that removes predetermined frequency components included in the direct current converted by the diodes 270a to 270d. One end of the reactor 270e is connected to the cathodes of the diodes 270a and 270c. One end of the capacitor 270f is connected to the other end of the reactor 270e, and the other end is connected to the anodes of the diodes 270b and 270d.

The reception-side converter circuit 271 includes a capacitor 271a, a reactor 271b, an IGBT 271c, a diode 271d, and a capacitor 271e. The capacitor 270f of the rectifier circuit 270 also serves as the capacitor 271a. The capacitor 271a, the reactor 271b, the IGBT 271c, the diode 271d, and the capacitor 271e have the same configurations as the capacitor 171a, the reactor 171b, the IGBT 171c, the diode 171d, and the capacitor 171e according to the first embodiment.

The control circuit 28 includes a transmission-side current sensor 280, a transmission-side control circuit 281, a reception-side current sensor 282, and a reception-side control circuit 283, and has the same configuration as the control circuit 18 according to the first embodiment.

The operation of the above-described non-contact power supply apparatus 2 is the same as that of the non-contact power supply apparatus 1 according to the first embodiment.

Figure 10:
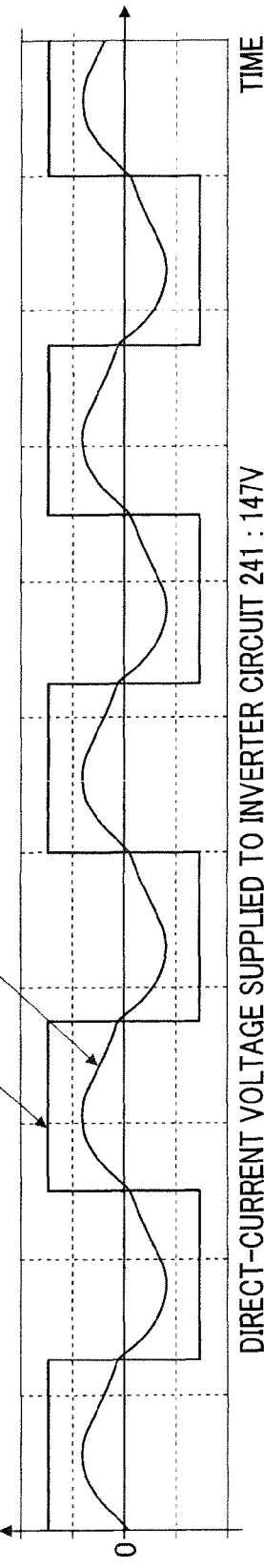
FIG. 10 is a waveform diagram of an alternating current that is supplied from an inverter circuit to a transmission-side pad connected to a transmission-side resonant circuit, when the coupling coefficient is 0.13, according to the second embodiment.

As shown in FIG. 10, when the transmission-side pad 20 and the reception-side pad 22 are in a predetermined positional relationship that serves as reference and the coupling coefficient is, for example, 0.13, as a result of the direct-current voltage supplied from the transmission-side converter circuit 240 to the inverter circuit 241 being controlled to 147 V and the direct-current voltage supplied from the rectifier circuit 270 to the reception-side converter circuit 271 being controlled to 100 V, the alternating-current voltage supplied from the inverter circuit 241 to the transmission-side pad 20 connected to the transmission-side resonant circuit 21 and the alternating-current voltage supplied from the reception-side pad 22 connected to the reception-side resonant circuit 23 to the rectifier circuit 270 can be controlled. The power factor can be controlled to be substantially 1, and the direct-current power supplied from the reception-side converter circuit 271 to the on-board battery B21 can be controlled to 1 kW.

Figure 11:
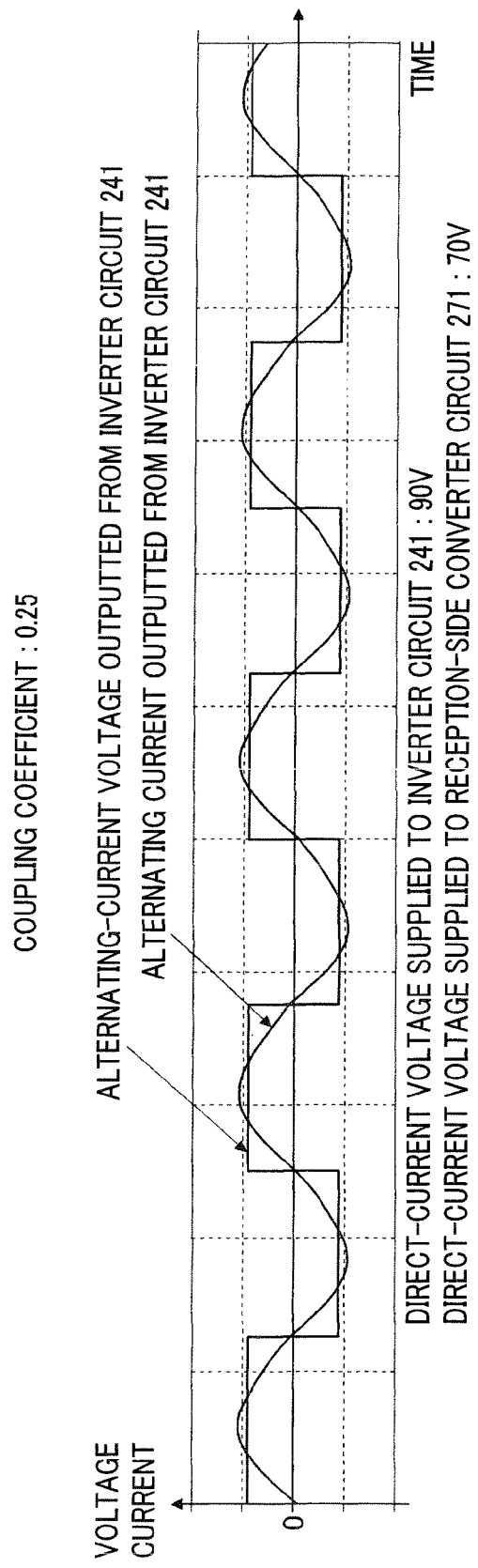
FIG. 11 is a waveform diagram of an alternating current that is supplied from an inverter circuit to a transmission-side pad connected to a transmission-side resonant circuit, when the coupling coefficient is 0.25, according to the second embodiment.

As shown in FIG. 11, when the positional relationship between the transmission-side pad 20 and the reception-side pad 22 changes and the coupling coefficient changes from 0.13 to, for example, 0.25, as a result of the direct-current voltage supplied from the transmission-side converter circuit 240 to the inverter circuit 241 being controlled to 90 V and the direct-current voltage supplied from the rectifier circuit 270 to the reception-side converter circuit 271 being controlled to 70 V, the alternating-current voltage supplied from the inverter circuit 241 to the transmission-side pad 20 connected to the transmission-side resonant circuit 21 and the alternating-current voltage supplied from the reception-side pad 22 connected to the reception-side resonant circuit 23 to the rectifier circuit 270 can be controlled. The power factor can be controlled to substantially 1, and the direct-current power supplied from the reception-side converter circuit 271 to the on-board battery B21 can be controlled to 1 kW. Even when the coupling coefficient changes from 0.13 to 0.25, direct-current power of 1 kW, which is the target, can be supplied to the on-board battery B21 without reduction in power factor, as a result of the direct-current voltage supplied from the transmission-side converter circuit 240 to the inverter circuit 241 and the direct-current voltage supplied from the rectifier circuit 270 to the reception-side converter circuit 271 being controlled.

Figure 12:
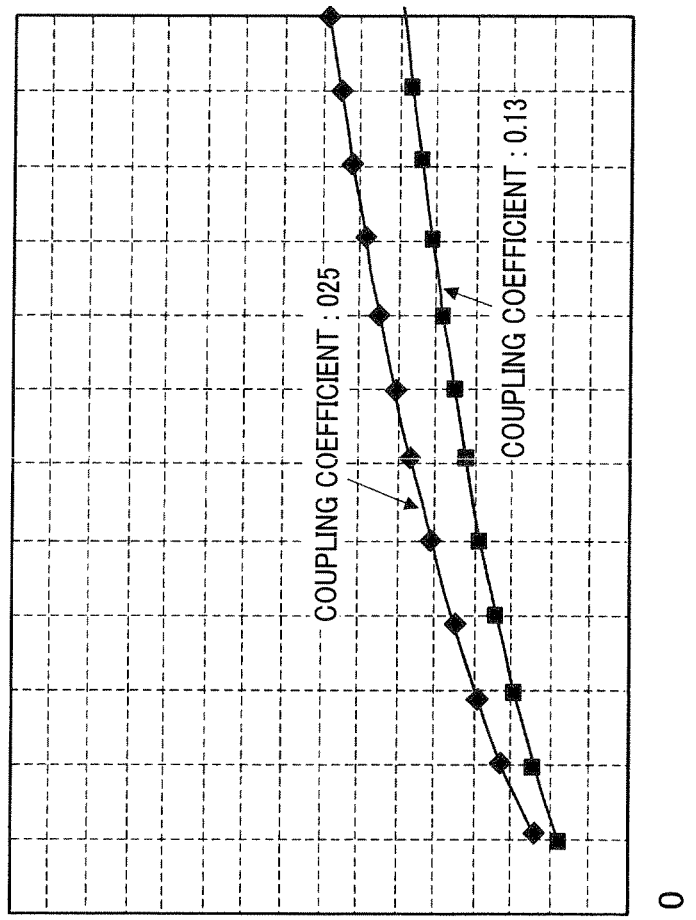
FIG. 12 is a graph that indicates the relationship between direct-current power supplied to an on-board battery of the non-contact power supply apparatus and the alternating current supplied from the inverter circuit to the transmission-side pad connected to the transmission-side resonant circuit, according to the second embodiment.
Figure 13:
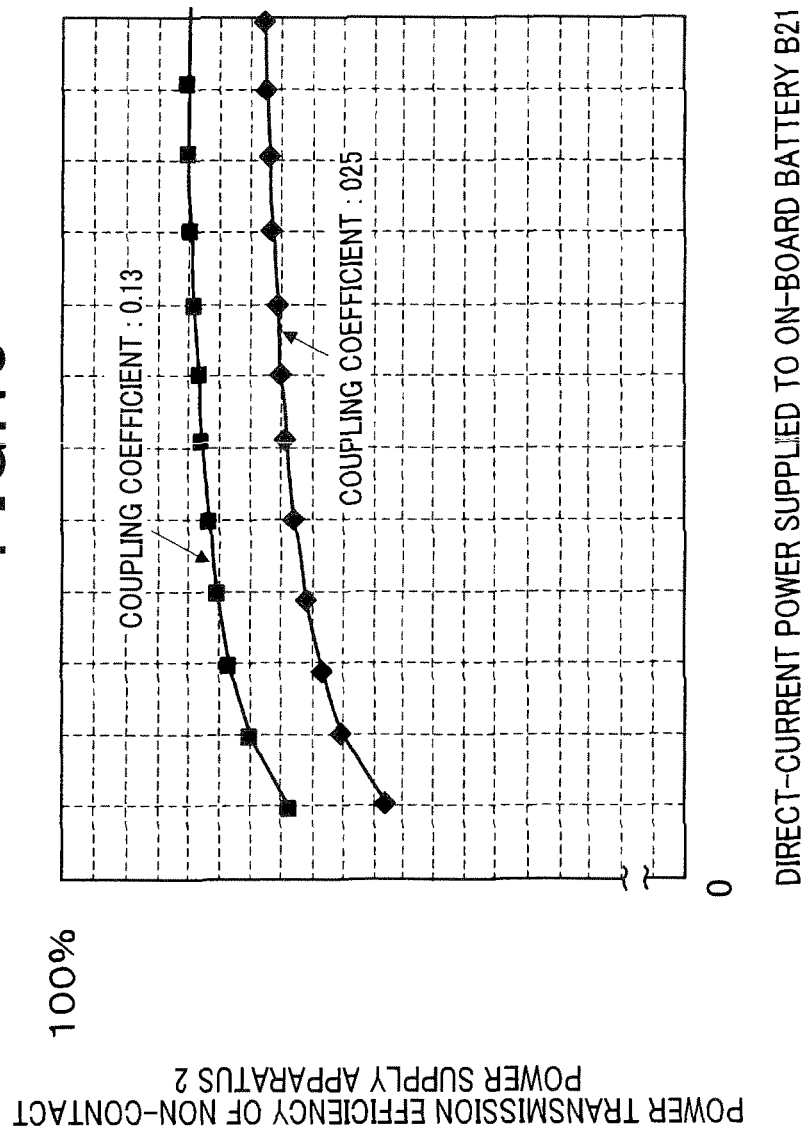
FIG. 13 is a graph that indicates the relationship between the direct-current power supplied to the on-board battery of the non-contact power supply apparatus and power transmission efficiency, according to the second embodiment.

The non-contact power supply apparatus 2 can maintain the power factor at substantially 1, even when the coupling coefficient of the transmission-side pad 20 and the reception-side pad 22 changes from 0.13 to 0.25. Therefore, as shown in FIG. 12, increase in the alternating current supplied from the inverter circuit 241 to the transmission-side pad 20 connected to the transmission-side resonant circuit 21 can be suppressed regardless of the value of the direct-current power supplied to the on-board battery B21. As a result, as shown in FIG. 13, decrease in power transmission efficiency of the non-contact power supply apparatus 2 can be suppressed, compared to that in the past, regardless of the vehicle of the direct-current power supplied to the on-board battery B21. The vertical axis and the horizontal axis in FIG. 12, as well as the horizontal axis in FIG. 13 indicate current and power in dimensionless quantities.

Next, effects of the second embodiment will be described.

According to the second embodiment, even when the reception-side filter circuit is not present, as a result of a configuration that is the same as that according to the first embodiment being and the reception-side converter circuit 271 being controlled taking into consideration the characteristics of the alternating-current voltage inputted to the rectifier circuit 270 and the direct-current voltage outputted from the rectifier circuit 270, effects similar to those according to the first embodiment that correspond to the same configuration can be achieved.

Third Embodiment

Next, a non-contact power supply apparatus according to a third embodiment will be described with reference to FIG. 14.

Whereas the non-contact power supply apparatus according to the first embodiment transmits electric power from the external battery to the on-board battery, the non-contact power supply apparatus according to the third embodiment is capable of transmitting electric power from the on-board battery to the external battery as well, by partial modification of the configurations of the power transmission circuit and the power reception circuit, and control performed by the control circuit.

First, a configuration of the non-contact power supply apparatus according to the third embodiment will be described with reference to FIG. 14.

Figure 14:
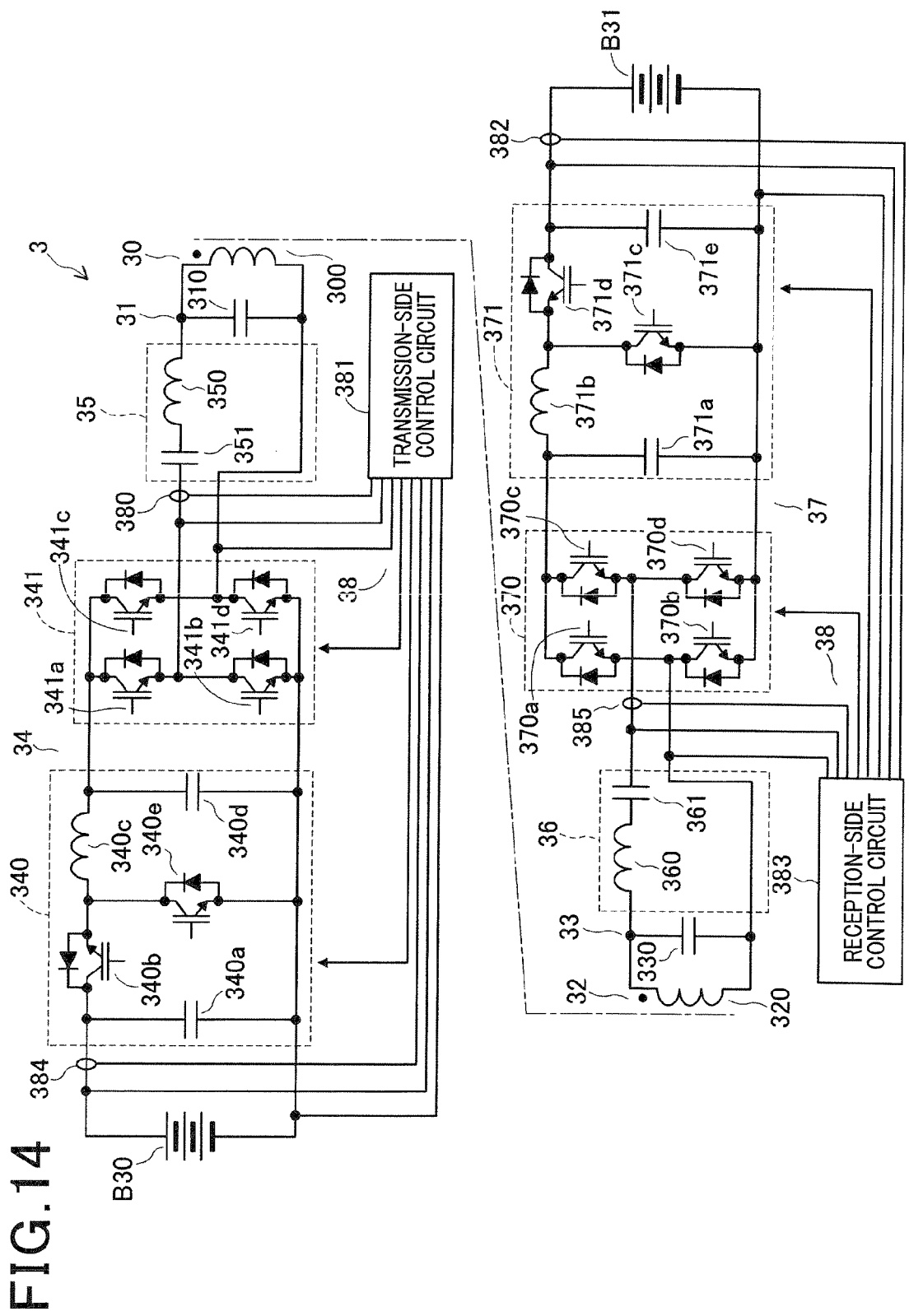
FIG. 14 is a circuit diagram of a non-contact power supply apparatus according to a third embodiment.

In a manner similar to the non-contact power supply apparatus 1 according to the first embodiment, a non-contact power supply apparatus 3 shown in FIG. 14 is an apparatus that charges an on-board battery B31 (power supply target) by transmitting electric power without contact to the on-board battery B31 from an external battery B30 (direct-current power supply). In addition, the non-contact power supply apparatus 3 is also an apparatus that can charge the external battery B30 by transmitting electric power without contact to the external battery B30 from the on-board battery B31. The non-contact power supply apparatus 3 includes a transmission-side pad 30, a transmission-side resonant circuit 31, a reception-side pad 32, a reception-side resonant circuit 33, a power transmission circuit 34, a transmission-side filter circuit 35, a reception-side filter circuit 36, a power reception circuit 37, and a control circuit 38

The transmission-side pad 30 includes a coil 300. The transmission-side resonant circuit 31 is a capacitor 310. The reception-side pad 32 includes a coil 320. The reception-side resonant circuit 33 is a capacitor 330. The transmission-side pad 30, the transmission-side resonant circuit 31, the reception-side pad 32, and the reception-side resonant circuit 33 have the same configurations as the transmission-side pad 10, the transmission-side resonant circuit 11, the reception-side pad 12, and the reception-side resonant circuit 13 according to the first embodiment.

The power transmission circuit 34 is a circuit that converts the direct current supplied from the external battery B30 to an alternating current and supplies the alternating current to the transmission-side pad 30 connected to the transmission-side resonant circuit 31. In addition, the power transmission circuit 34 is also a circuit that can convert the alternating current supplied from the transmission-side pad 30 connected to the transmission-side resonant circuit 31 to a direct current and supply the direct current to the external battery B30. The power transmission circuit 34 includes a transmission-side converter circuit 340 (transmission-side direct-current/direct-current converter circuit) and an inverter circuit 341 (transmission-side direct-current/alternating-current converter circuit).

The transmission-side converter circuit 340 is a circuit that converts the direct current supplied from the external battery B30 to a different direct current and supplies the different direct current to the inverter circuit 341. Specifically, the transmission-side converter circuit 340 is a circuit that steps down the voltage of the direct current supplied from the external battery B30 and supplies the direct current to the inverter circuit 341. In addition, the transmission-side converter circuit 340 is also a circuit that can convert the direct current supplied from the inverter circuit 341 to a different direct current and supply the direct current to the external battery B30. Specifically, the transmission-side converter circuit 340 is also a circuit that can step up the voltage of the direct current supplied from the inverter circuit 341 and supply the direct current to the external battery B30. The transmission-side converter circuit 340 is a known bidirectional step-up/step-down converter circuit. The transmission-side converter circuit 340 includes a capacitor 340a, an IGBT 340b, a reactor 340c, a capacitor 340d, and an IGBT 340e. The transmission-side converter circuit 340 is that in which the diode 140e in the transmission-side converter circuit 140 according to the first embodiment is replaced with the IGBT 340e that has a freewheeling diode that is connected in inverse parallel between the collector and the emitter.

The inverter circuit 341 is a circuit that converts the direct current supplied from the transmission-side converter circuit 340 to an alternating current that has a predetermined frequency, and supplies the alternating current to the transmission-side pad 30 connected to the transmission-side resonant circuit 31. In addition, the inverter circuit 341 is a circuit that can rectify the alternating current supplied from transmission-side pad 30 connected to the transmission-side resonant circuit 31, convert the rectified alternating current to a direct current, and supply the direct current to the transmission-side converter circuit 340. The inverter circuit 341 includes IGBTs 341a to 341d, and has the same configuration as the inverter circuit 141 according to the first embodiment. The inverter circuit 341 can rectify the alternating current supplied from transmission-side pad 30 connected to the transmission-side resonant circuit 31, convert the rectified alternating current to a direct current, and supply the direct current to the transmission-side converter circuit 340 as a result of the freewheeling diode.

The transmission-side filter circuit 35 includes a reactor 350 and a capacitor 351. The reception-side filter circuit 36 includes a reactor 360 and a capacitor 361. The transmission-side filter circuit 35 and the reception-side filter circuit 36 have the same configurations as the transmission-side filter circuit 15 and the reception-side filter circuit 16 according to the first embodiment.

The power reception circuit 37 is a circuit that converts the alternating current supplied from the reception-side pad 32 connected to the reception-side resonant circuit 33 to a direct current and supplies the direct current to the on-board battery B31. In addition, the power reception circuit 37 is also a circuit that can convert the direct current supplied from the on-board battery B31 to an alternating current and supply the alternating current to the reception-side pad 32 connected to the reception-side resonant circuit 33. The power reception circuit includes a rectifier circuit 370 (reception-side alternating-current/direct-current converter circuit) and a reception-side converter circuit 371 (reception-side direct-current/direct-current converter circuit).

The rectifier circuit 370 is a circuit that rectifies the alternating current supplied from the reception-side pad 32 connected to the reception-side resonant circuit 33, converts the rectified alternating current to a direct current, and supplies the direct current to the reception-side converter circuit 371. In addition, the rectifier circuit 370 is also a circuit that can convert the direct current supplied from the reception-side converter circuit 371 to an alternating current, and supply the alternating current to the reception-side pad 32 connected to the reception-side resonant circuit 33. The rectifier circuit 370 is that in which the diodes 170a to 170d in the rectifier circuit 170 according to the first embodiment are replaced with the IGBTs 370a to 370d that each have a freewheeling diode that is connected in inverse parallel between the collector and the emitter.

The reception-side converter circuit 371 is a circuit that converts the direct current supplied from the rectifier circuit 370 to a direct current that has a different voltage and supplies the direct current to the on-board battery B31. Specifically, the reception-side converter circuit 371 is a circuit that steps up the voltage of the direct current supplied from the rectifier circuit 370 and supplies the stepped-up direct current to the on-board battery B31. In addition, the reception-side converter circuit 371 is also a circuit that can convert the direct current supplied from the on-board battery B31 to a direct current that has a different voltage and supply the direct current to the rectifier circuit 370. Specifically, the reception-side converter circuit 371 is also a circuit that can step down the voltage of the direct current supplied from the on-board battery B31 and supply the direct current to the rectifier circuit 370. The reception-side converter circuit 371 is a known bidirectional step-up/step-down converter circuit. The reception-side converter circuit 371 includes a capacitor 371a, a reactor 371b, IGBTs 371c and 371d, and a capacitor 371e. The reception-side converter circuit 371 is that in which the diode 171d in the reception-side converter circuit 171 according to the first embodiment is replaced with the IGBT 371d that has a freewheeling diode that is connected in inverse parallel between the collector and the emitter.

In a manner similar to the control circuit 18 according to the first embodiment, the control circuit 38 is a circuit that controls the power transmission circuit 34 and the power reception circuit 37 to transmit electric power from the external battery B30 to the on-board battery B31. In addition, unlike the control circuit 18 according to the first embodiment, the control circuit 38 is also a circuit that controls the power transmission circuit 34 and the power reception circuit 37 to transmit electric power from the on-board battery B31 to the external battery 30. Specifically, the control circuit 38 is a circuit that controls the alternating-current voltage supplied from the power reception circuit 37 to the reception-side pad 30 connected to the reception-side resonant circuit 31 and the alternating-current voltage supplied from the inverter circuit 341 to the transmission-side converter circuit 340, so that the power factor of the alternating current supplied from the power reception circuit 37 to the reception-side pad 30 connected to the reception-side resonant circuit 31 and the direct-current power supplied from the power transmission circuit 34 to the external battery B30 are respectively set to target values. The control circuit 38 includes transmission-side current sensors 380 and 384, a transmission-side control circuit 381, reception-side current sensors 382 and 385, and a reception-side control circuit 383.

The transmission-side current sensor 380 has the same configuration as the transmission-side current sensor 180 according to the first embodiment.

The transmission-side current sensor 384 is an element that detects the direct current supplied from the transmission-side converter circuit 340 to the external battery B30, and outputs the detection result. The transmission-side current sensor 384 is provided on wiring connecting the transmission-side converter circuit 340 and the external battery B30, so as to be clamped onto the wiring. The output end of the transmission-side current sensor 384 is connected to the transmission-side control circuit 381.

The transmission-side control circuit 381 is a circuit that is connected to the power transmission circuit 34 and the transmission-side current sensors 380 and 384. The transmission-side control circuit 381 uses wireless communication to transmit to and receive from the reception-side control circuit 383, information necessary for control. The transmission-side control circuit 381 thereby controls the transmission-side converter circuit 340 and the inverter circuit 341. In a manner similar to the transmission-side control circuit 181 according to the first embodiment, the transmission-side control circuit 381 determines the power factor of the alternating current supplied from the inverter circuit 341 to the transmission-side pad 30 connected to the transmission-side resonant circuit 31, and transmits the determined power factor to the reception-side control circuit 383. Then, the transmission-side control circuit 381 controls the alternating-current voltage supplied from the inverter circuit 341 to the transmission-side pad 30 connected to the transmission-side resonant circuit 31 so that the power factor of the alternating current supplied from the inverter circuit 341 to the transmission-side pad 30 connected to the transmission-side resonant circuit 31 and the direct-current power supplied from the reception-side converter circuit 371 to the on-board battery B31 that is has been received from the reception-side control circuit 383 are respectively set to the target values. Specifically, the transmission-side control circuit 381 controls the direct-current voltage supplied to the inverter circuit 341 by turning OFF the IGBT 340e and controlling the switching of the IGBT 340b. In addition, the transmission-side control circuit 381 controls the switching of the IGBTs 341a to 341d so as to achieve 180-degree rectangular wave energization.

Furthermore, unlike the transmission-side control circuit 181 according to the first embodiment, to transmit electric power from the on-board battery B31 to the external battery B30, the transmission-side control circuit 381 determines the direct-current power supplied from the power transmission circuit 34 to the external battery B30, based on the detection result of the voltage supplied from the transmission-side converter circuit 340 to the external battery B30 and the detection result from the transmission-side current sensor 384. The transmission-side control circuit 381 then transmits the determined direct-current power to the reception-side control circuit 383. Then, the transmission-side control circuit 381 controls the direct-current voltage supplied from the inverter circuit 341 to the transmission-side converter circuit 340, so that the power factor of the alternating current supplied from the rectifier circuit 370 to the reception-side pad 32 connected to the reception-side resonant circuit 33 that has been received from the reception-side control circuit 383 and the direct-current power supplied from the transmission-side converter circuit 340 to the external battery B30 are respectively set to the target values. Specifically, the transmission-side control circuit 381 controls the direct-current voltage supplied to the transmission-side converter circuit 340 by turning OFF the IGBT 340*b* and controlling the switching of the IGBT 340*e*. The transmission-side control circuit 381 is connected to the gates of the IGBTs 340*b*, 340*e*, and 341*a* to 341*d*. In addition, the transmission-side control circuit 381 is connected to the connection point between the IGBTs 341*a* and 341*b*, the connection point between the IGBTs 341*c* and 341*d*, and one end and the other end of the capacitor 340*a*. Furthermore, the transmission-side control circuit 381 is connected to the output ends of the transmission-side current sensors 380 and 384.

The reception-side current sensor 382 has the same configuration as the reception-side current sensor 182 according to the first embodiment.

The reception-side current sensor 385 is an element that detects the alternating current supplied from the rectifier circuit 370 to the reception-side pad 32 connected to the reception-side resonant circuit 33, and outputs the detection result. The reception-side current sensor 385 is provided on wiring connecting the rectifier 370 and the reception-side filter circuit 36, so as to be clamped onto the wiring. The output end of the reception-side current sensor 385 is connected to the reception-side control circuit 383.

The reception-side control circuit 383 is a circuit that is connected to the power reception circuit 37 and the reception-side current sensors 382 and 385. The reception-side control circuit 383 uses wireless communication to transmit to and receive from the transmission-side control circuit 381, information necessary for control. The reception-side control circuit 383 thereby controls the power reception circuit 37. In a manner similar to the reception-side control circuit 183 according to the first embodiment, the reception-side control circuit 383 determines the direct-current power supplied from the power reception circuit 37 to the on-board battery B31 and transmits the determined direct-current power to the transmission-side control circuit 381. Then, the reception-side control circuit 383 controls the direct-current voltage supplied from the rectifier circuit 370 to the reception-side converter circuit 371, so that the power factor of the alternating current supplied from the inverter circuit 341 to the transmission-side pad 30 connected to the transmission-side resonant circuit 31 and the direct-current power supplied from the reception-side converter circuit 371 to the on-board battery B31 are respectively set to the target values. Specifically, the reception-side control circuit 383 controls the direct-current voltage supplied to the reception-side converter circuit 371 by turning OFF the IGBT 371*d* and controlling the switching of the IGBT 371*c*.

Furthermore, unlike the reception-side control circuit 183 according to the first embodiment, to transmit electric power from the on-board battery B31 to the external battery B30, the reception-side control circuit 383 determines the power factor of the alternating current supplied from the rectifier circuit 370 to the reception-side pad 32 connected to the reception-side resonant circuit 33, based on the detection result of the alternating-current voltage supplied from the rectifier circuit 370 to the reception-side pad 32 connected to the reception-side resonant circuit 33 and the detection result from the reception-side current sensor 385. The reception-side control circuit 383 then transmits the determined power factor to the transmission-side control circuit 381. Then, the reception-side control circuit 383 controls the alternating current supplied from the rectifier circuit 370 to the reception-side pad 32 connected to the reception-side resonant circuit 33, so that the power factor of the alternating current supplied from the rectifier circuit 370 to the reception-side pad 32 connected to the reception-side resonant circuit 33 and the direct-current power supplied from the transmission-side converter circuit 340 to the external battery B30 that has been received from the transmission-side control circuit 381 are respectively set to the target values. Specifically, the reception-side control circuit 383 controls the direct-current voltage supplied to the rectifier circuit 370 by turning OFF the IGBT 371*c* and controlling the switching of the IGBT 371*d*. In addition, the reception-side control circuit 383 controls the switching of the IGBTs 370*a* to 370*d* so as to achieve 180-degree rectangular wave energization. The reception-side control circuit 383 is connected to the gates of the IGBTs 370*a* to 370*d*, 371*c*, and 371*d*. In addition, the reception-side control circuit 383 is connected to one end and the other end of the capacitor 371*e*, the connection point between the IGBTs 370*a* and 370*b*, and the connection point between the IGBTs 370*c* and 370*d*. Furthermore, the reception-side control circuit 383 is connected to the output ends of the reception-side current sensors 382 and 385.

Next, the operations of the non-contact power supply apparatus 3 will be described with reference to FIG. 14. The operation for transmitting electric power from the external battery B30 to the on-board battery is the same as that of the non-contact power supply apparatus 1 according to the first embodiment. Therefore, description thereof is omitted. The operation for transmitting electric power from the on-board battery B31 to the external battery B30 will be described.

The reception-side control circuit 383 determines the power factor of the alternating current supplied from the rectifier circuit 370 to the reception-side pad 32 connected to the reception-side resonant circuit 33, based on the detection result of the voltage supplied from the rectifier circuit 370 to the reception-side pad 32 connected to the reception-side resonant circuit 33 and the detection result from the reception-side current sensor 385. The reception-side control circuit 383 then transmits the determined power factor to the transmission-side control circuit 381. On the other hand, the transmission-side control circuit 381 determines the direct-current power supplied from the transmission-side converter circuit 340 to the external battery B30, based on the detection result of the voltage supplied from the transmission-side converter circuit 340 to the external battery B30 and the detection result from the transmission-side current sensor 384. The transmission-side control circuit 381 then transmits the determined direct-current power to the reception-side control circuit 383.

The reception-side control circuit 383 controls the alternating current supplied from the rectifier circuit 370 to the reception-side pad 32 connected to the reception-side resonant circuit 33, so that the power factor of the alternating current supplied from the rectifier circuit 370 to the reception-side pad 32 connected to the reception-side resonant circuit 33 and the direct-current power supplied from the transmission-side converter circuit 340 to the external battery B30 that has been received from the transmission-side control circuit 381 are respectively set to the target values. Specifically, the reception-side control circuit 383 controls the direct-current voltage supplied to the rectifier circuit 370 by turning OFF the IGBT 371*c* and controlling the switching of the IGBT 371*d*. In addition, the reception-side control circuit 383 controls the switching of the IGBTs 370*a* to 370*d* so as to achieve 180-degree rectangular wave energization.

On the other hand, the transmission-side control circuit 381 controls the direct-current voltage supplied from the inverter circuit 341 to the transmission-side converter circuit 340, so that the power factor of the alternating current supplied from the rectifier circuit 370 to the reception-side pad 32 connected to the reception-side resonant circuit 33 that has been received from the reception-side control circuit 383 and the direct-current power supplied from the transmission-side converter circuit 340 to the external battery B30 are respectively set to the target values. Specifically, the transmission-side control circuit 381 controls the direct-current voltage supplied to the transmission-side converter circuit 340 by turning off the IGBTs 341a to 341d, turning OFF the IGBT 340b, and controlling the switching of the IGBT 340e. Therefore, change in power factor can be suppressed even when the coupling coefficient of the transmission-side pad 30 and the reception-side pad 32 changes, and predetermined electric power can also be transmitted from the on-board battery B31 to the external battery B30.

Next, effects of the third embodiment will be described.

First, the third embodiment includes the same configurations as those in the first embodiment, thus providing the same effects as those provided in the first embodiment.

Furthermore, according to the third embodiment, the reception-side converter circuit 371 can step down the voltage of the direct current supplied from the on-board battery B31 and supply the direct current to the rectifier circuit 370. The rectifier circuit 370 can convert the direct current supplied from the reception-side converter circuit 371 to an alternating current, and supply the alternating current to the reception-side pad 32 connected to the reception-side resonant circuit 33. The inverter circuit 341 can rectify the alternating current supplied from the reception-side pad 32 connected to the reception-side resonant circuit 33, convert the rectified alternating current to a direct current, and supply the direct current to the transmission-side converter circuit 340. The transmission-side converter circuit 340 can step up the voltage of the direct current supplied from the inverter circuit 341 and supply the direct current to the external battery B30. As a result, the external battery B30 can be charged by electric power being transmitted without contact from the on-board battery B31 to the external battery B30. Therefore, change in power factor can be suppressed even when the coupling coefficient of the transmission-side pad 30 and the reception-side pad 32 changes, and predetermined electric power can be transmitted from the on-board battery B31 to the external battery B30.

Fourth Embodiment

Next, a non-contact power supply apparatus according to a fourth embodiment will be described with reference to FIG. 15.

The non-contact power supply apparatus according to the fourth embodiment is that in which the configurations of the transmission-side filter circuit and the reception-side filter circuit are partially modified, and isolation transformers are respectively provided between the transmission-side filter circuit and the transmission-side pad connected to the transmission-side resonant circuit and between the reception-side filter circuit and the reception-side pad connected to the reception-side resonant circuit in the non-contact power supply apparatus according to the first embodiment.

First, a configuration of the non-contact power supply apparatus according to the fourth embodiment will be described with reference to FIG. 15.

Figure 15:
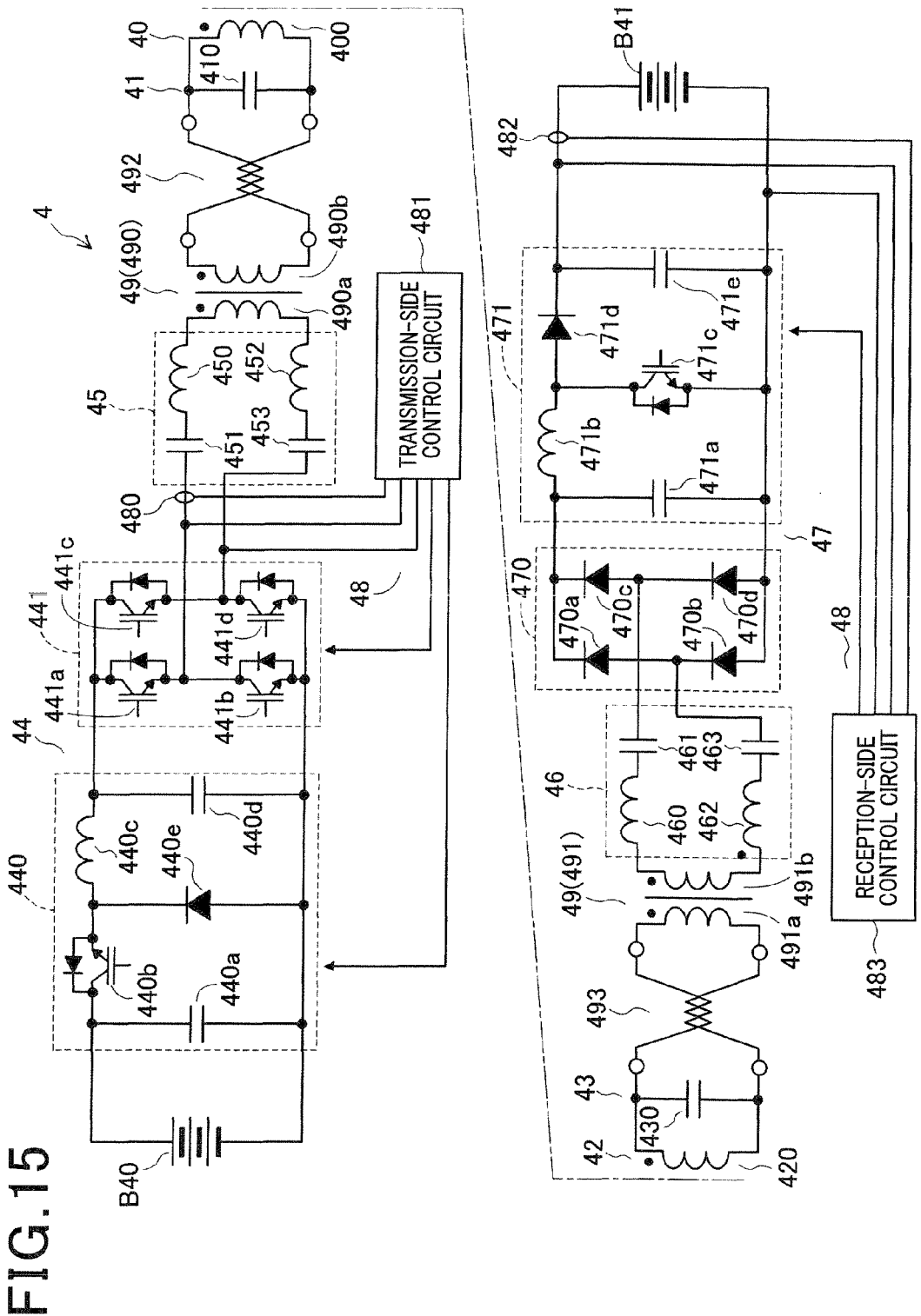
FIG. 15 is a circuit diagram of a non-contact power supply apparatus according to a fourth embodiment.

A non-contact power supply apparatus 4 shown in FIG. 15 is an apparatus that charges an on-board battery B41 (power supply target) by transmitting electric power without contact to the on-board battery B41 from an external battery B40 (direct-current power supply). The non-contact power supply apparatus 4 includes a transmission-side pad 40, a transmission-side resonant circuit 41, a reception-side pad 42, a reception-side resonant circuit 43, a power transmission circuit 44, a transmission-side filter circuit 45, a reception-side filter circuit 46, a power reception circuit 47, a control circuit 48, and an isolation transformer 49.

The transmission-side pad 40 includes a coil 400. The transmission-side resonant circuit 41 is a capacitor 410. The reception-side pad 42 includes a coil 420. The reception-side resonant circuit 43 is a capacitor 430. The transmission-side pad 40, the transmission-side resonant circuit 41, the reception-side pad 42, and the reception-side resonant circuit 43 have the same configurations as the transmission-side pad 10, the transmission-side resonant circuit 11, the reception-side pad 12, and the reception-side resonant circuit 13 according to the first embodiment.

The power transmission circuit 44 includes a transmission-side converter circuit 440 (transmission-side direct-current/direct-current converter circuit) and an inverter circuit 441 (transmission-side direct-current/alternating-current converter circuit). The transmission-side converter circuit 440 includes a capacitor 440a, an IGBT 440b, a reactor 440c, a capacitor 440d, and a diode 440e. The inverter circuit 441 includes IGBTs 441a to 441d. The power transmission circuit 44 has the same configuration as the power transmission circuit 14 according to the first embodiment.

The transmission-side filter circuit 45 includes reactors 450 and 452 and capacitors 451 and 453.

The reactor 450 and the capacitor 451 are connected in series. Specifically, one end of the reactor 450 is connected to one end of the capacitor 451. The other end of the reactor 450 is connected to the isolation transformer 49. The other end of the capacitor 451 is connected to the connection point between the IGBTs 441a and 441b.

The reactor 452 and the capacitor 453 are connected in series. Specifically, one end of the reactor 452 is connected to one end of the capacitor 453. The other end of the reactor 452 is connected to the isolation transformer 49. The other end of the capacitor 453 is connected to the connection point between the IGBTs 441c and 441d.

The transmission-side filter circuit 45 is set so that the impedance at the fundamental frequency of the alternating current supplied from the power transmission circuit 44 is smaller than the impedance of the resonant circuit configured by the transmission-side pad 40 and the transmission-side resonant circuit 41. Specifically, the inductances of the reactors 450 and 452 and the capacities of the capacitors 451 and 453 are set so that the resonant frequency is the fundamental frequency of the alternating current supplied from the power transmission circuit 44. Moreover, the inductances of the reactors 450 and 452 and the capacities of the capacitors 451 and 453 are set so as to be equal to each other.

The power reception circuit 47 includes a rectifier circuit 470 (reception-side alternating-current/direct-current converter circuit) and a reception-side converter circuit 471 (reception-side direct-current/direct-current converter circuit). The rectifier circuit 470 includes diodes 470a to 470d. The reception-side converter circuit 471 includes a capacitor 471a, a reactor 471b, an IGBT 471c, a diode 471d, and a capacitor 471e. The control circuit 48 includes a transmission-side current sensor 480, a transmission-side control circuit 481, a reception-side current sensor 482, and a reception-side control circuit 483. The power reception circuit 47 and the control circuit 48 have the same configuration as the power reception circuit 17 and the control circuit 18 according to the first embodiment.

The isolation transformer 49 is a device that is connected between the transmission-side filter circuit 45 and the transmission-side pad 40 connected to the transmission-side resonant circuit 41, and between the reception-side pad 42 connected to the reception-side resonant circuit 43 and the reception-side filter circuit 46. The isolation transformer 49 electrically isolates the transmission-side filter circuit 45 and the transmission-side pad 40 connected to the transmission-side resonant circuit 41, as well as the reception-side pad 42 connected to the reception-side resonant circuit 43 and the reception-side filter circuit 46. The isolation transformer 49 includes a transmission-side isolation transformer 490 and a reception-side isolation transformer 491.

The transmission-side isolation transformer 490 is a device that is connected between the transmission-side filter circuit 45 and the transmission-side pad 40 connected to the transmission-side resonant circuit 41. The transmission-side isolation transformer 490 electrically isolates the transmission-side filter circuit 45 and the transmission-side pad 40 connected to the transmission-side resonant circuit 41. The transmission-side isolation transformer 490 includes a primary coil 490a and a secondary coil 490b. One end of the primary coil 490a is connected to the other end of the reactor 450, and the other end is connected to the other end of the reactor 452. One end of the secondary coil 490b is connected to one end of the coil 400 connected to the capacitor 410, with a wiring cable 492 therebetween, and the other end is connected to the other end of the coil 400 connected to the capacitor 410, with the wiring cable 492 therebetween.

The reception-side isolation transformer 491 is a device that is connected between the reception-side pad 42 connected to the reception-side resonant circuit 43 and the reception-side filter circuit 46. The reception-side isolation transformer 491 electrically isolates the reception-side pad 42 connected to the reception-side resonant circuit 43 and the reception-side filter circuit 46. The reception-side isolation transformer 491 includes a primary coil 491a and a secondary coil 491b. One end of the primary coil 491a is connected to one end of the coil 420 connected to the capacitor 430, with a wiring cable 493 therebetween, and the other end is connected to the other end of the coil 420 connected to the capacitor 430, with the wiring cable 493 therebetween. One end and the other end of the secondary coil 491b is connected to the reception-side filter circuit 46.

The reception-side filter circuit 46 includes reactors 460 and 462 and capacitors 461 and 463.

The reactor 460 and the capacitor 461 are connected in series. Specifically, one end of the reactor 460 is connected to one end of the capacitor 461. The other end of the reactor 460 is connected to one end of the secondary coil 491b. The other end of the capacitor 461 is connected to the connection point between the diodes 470c and 470d.

The reactor 462 and the capacitor 463 are connected in series. Specifically, one end of the reactor 462 is connected to one end of the capacitor 463. The other end of the reactor 460 is connected to the other end of the secondary coil 491b. The other end of the capacitor 463 is connected to the connection point between the diodes 470a and 470b.

The reception-side filter circuit 46 is set so that the impedance at the fundamental frequency of the alternating current supplied from the power transmission circuit 44 is smaller than the impedance of the resonant circuit configured by the reception-side pad 42 and the reception-side resonant circuit 43. Specifically, the inductances of the reactors 460 and 462 and the capacities of the capacitors 461 and 463 are set so that the resonant frequency is the fundamental frequency of the alternating current supplied from the power transmission circuit 44. Moreover, the inductances of the reactors 460 and 462 and the capacities of the capacitors 461 and 463 are set so as to be equal to each other.

The operation of the above-described non-contact power supply apparatus 4 is the same as that according to the first embodiment. Therefore, description thereof will be omitted.

Next, effects of the fourth embodiment will be described.

According to the fourth embodiment, because configurations that are the same as those according to the first embodiment are provided, effects similar to those according to the first embodiment that correspond to the same configurations can be achieved.

Furthermore, according to the fourth embodiment, the transmission-side filter circuit 45 is configured by two pairs of serially connected reactor and capacitor, the reactor 450 and the capacitor 451, and the reactor 452 and the capacitor 453, of which the inductances and the capacities are equal to each other. The reactor 450 and the capacitor 451, which is one of the serially connected reactor and capacitor combinations, is connected between one output end of the power transmission circuit 44 and one end of the transmission-side pad 40 connected to the transmission-side resonant circuit 41. The reactor 452 and the capacitor 453, which is the other of the serially connected reactor and capacitor, is connected between the other output end of the power transmission circuit 44 and the other end of the transmission-side pad 40 connected to the transmission-side resonant circuit 41.

The reception-side filter circuit 46 is configured by two pairs of serially connected reactors and capacitors, the reactor 460 and the capacitor 461, and the reactor 462 and the capacitor 463, of which the inductances and the capacities are equal to each other. The reactor 460 and the capacitor 461, which is one of the serially connected reactor and capacitor, is connected between one end of the reception-side pad 42 connected to the reception-side resonant circuit 43 and one input end of the power reception circuit 47. The reactor 462 and the capacitor 463, which is the other of the serially connected reactor and capacitor, is connected between the other end of the reception-side pad 42 connected to the reception-side resonant circuit 43 and the other input end of the power reception circuit 47.

Therefore, even should the earth capacitance change in either path of the pair of paths from the inverter circuit 441 to one end and the other end of the coil 400 via the transmission-side filter circuit 45 and the wiring cable 492 and the pair of paths from one end and the other end of the coil 420 to the rectifier circuit 470 via the wiring cable 493 and the reception-side filter circuit 46, predetermined frequency components can be removed on the other path and effects caused by noise can be suppressed.

According to the fourth embodiment, the transmission-side isolation transformer 490 and the reception-side isolation transformer 491 are provided. Therefore, electric shock can be prevented and safety can be improved.

According to the fourth embodiment, an example is given in which the configurations of the transmission-side filter circuit and the reception-side filter circuit are partially modified, and the isolation transformers are provided in the non-contact power supply apparatus according to the first embodiment. However, this is not limited thereto. The circuit configurations of the transmission-side filter circuit 45 and the reception-side filter circuit 46, and the circuit configuration using the isolation transformer 49 in the non-contact power supply apparatus 4 may be applied to the non-contact power supply apparatus 2 according to the second embodiment or the non-contact power supply apparatus 3 according to the third embodiment.

According to the fourth embodiment, an example is given in which the transmission-side filter circuit 45 and the reception-side filter circuit 4 respectively include the two pairs of reactors 450 and 452 and reactors 460 and 462. However, the reactors 450 and 452 and the reactors 460 and 462 may each be a coupled reactor that is configured so as to share a core. Balance can be achieved between the inductances of the two pairs of reactors, and noise-removal performance can be improved.

According to the first to fourth embodiments, an example is given in which the transmission-side filter circuit and the reception-side filter circuit are configured by reactors and capacitors. However, the reactor may be configured by a combination of a plurality of elements. The degree of freedom in design for current capacity and winding withstand voltage can be improved. The filter circuit can be configured with certainty, and loss can be reduced. In addition, the capacitor may be configured by a combination of a plurality of elements. The degree of freedom in design for current capacity and winding withstand voltage can be improved. The filter circuit can be configured with certainty, and loss can be reduced.

According to the first to fourth embodiments, an example is given in which the transmission-side resonant circuit and the reception-side resonant circuit are capacitors connected in parallel to coils. However, this is not limited thereto. The transmission-side resonant circuit and the reception-side resonant circuit may be capacitors connected in series to the coils. In addition, the transmission-side resonant circuit and the reception-side resonant circuit may be a combination of capacitors and reactors.

REFERENCE SIGNS LIST

1 non-contact power supply apparatus
10 transmission-side pad
11 transmission-side resonant circuit
12 reception-side pad
13 reception-side resonant circuit
14 power transmission circuit
100 and 120 coil
140 transmission-side converter circuit (transmission-side direct-current/direct-current converter circuit)
141 inverter circuit (transmission-side direct-current/alternating-current converter circuit)
15 transmission-side filter circuit
16 reception-side filter circuit
17 power reception circuit
170 rectifier circuit (reception-side alternating-current/direct-current converter circuit)
171 reception-side converter circuit (reception-side direct-current/direct-current converter circuit)
18 control circuit
B10 external battery (direct-current power supply)
B11 on-board battery (power supply target)

What is claimed is:

1. A non-contact power supply apparatus comprising:
   a transmission-side pad that has a coil and generates magnetic flux by being supplied alternating-current power;
   a transmission-side resonant circuit that is connected to the transmission-side pad and configures a resonant circuit together with the coil of the transmission-side pad;
   a reception-side pad that has a different coil and generates an alternating current by interlinking with the magnetic flux generated by the transmission-side pad;
   a reception-side resonant circuit that is connected to the reception-side pad and configures a resonant circuit together with the coil of the reception-side pad;
   a power transmission circuit that is connected to a direct-current power supply and to the transmission-side pad, and that converts a direct current supplied from the direct-current power supply to an alternating current and supplies the alternating current to the transmission-side pad connected to the transmission-side resonant circuit;
   a power reception circuit that is connected to the reception-side pad connected to the reception-side resonant circuit and to a power supply target, and that converts an alternating current supplied from the reception-side pad to a direct current and supplies the direct current to the power supply target; and
   a control circuit that is connected to the power transmission circuit and the power reception circuit, and controls the power transmission circuit and the power reception circuit, wherein
   the control circuit is configured to control an alternating-current voltage supplied from the power transmission circuit to the transmission-side pad and an alternating-current voltage supplied from the reception-side pad to the power reception circuit, so that a power factor of the alternating current supplied from the power transmission circuit to the transmission-side pad and direct-current power supplied from the power reception circuit to the power supply target are respectively set to target values, and transmit electric power from the direct-current power supply to the power supply target.

2. The non-contact power supply apparatus according to claim 1, wherein:
   the power reception circuit includes
      a reception-side alternating-current/direct-current converter circuit that is connected to the reception-side pad, and that converts the alternating current supplied from the reception-side pad to a direct current and outputs the direct current, and
      a reception-side direct-current/direct-current converter circuit that is connected to the reception-side alternating-current/direct-current converter circuit and the power supply target, and that converts the direct current supplied from the reception-side alternating-current/direct-current converter circuit to a direct current that has a different voltage and supplies the direct current to the power supply target; and
   the control circuit is configured to control the alternating-current voltage supplied from the power transmission circuit to the transmission-side pad and an alternating-current voltage supplied from the reception-side alternating-current/direct-current converter circuit to the reception-side direct-current/direct-current converter circuit, so that the power factor of the alternating current supplied from the power transmission circuit to the transmission-side pad and the direct-current power supplied from the power reception circuit to the power supply target are respectively set to target values, and transmit electric power from the direct-current power supply to the power supply target.

3. The non-contact power supply apparatus according to claim 2, wherein:
   the control circuit is configured to control the alternating-current voltage supplied from the power transmission circuit to the transmission-side pad by controlling the power transmission circuit, and control the direct-current voltage supplied from the reception-side alternating-current/direct-current converter circuit to the reception-side direct-current/direct-current converter circuit by controlling the reception-side direct-current/direct-current converter circuit.

4. The non-contact power supply apparatus according to claim 3, wherein:
the power transmission circuit includes
a transmission-side direct-current/direct-current converter circuit that is connected to the direct-current power supply, and that converts the direct current supplied from the direct-current power supply to a direct current that has a different voltage and outputs the direct current, and
a transmission-side direct-current/alternating-current converter circuit that is connected to the transmission-side direct-current/direct-current converter circuit and the transmission-side pad connected to the transmission-side resonant circuit, and that converts the direct current supplied from the transmission-side direct-current/direct-current converter circuit to an alternating current and supplies the alternating current to the transmission-side pad connected to the transmission-side resonant circuit; and
the control circuit is configured to control the alternating-current voltage supplied from the power transmission circuit to the transmission-side pad by controlling the transmission-side direct-current/direct-current converter circuit.

5. The non-contact power supply apparatus according to claim 4, wherein:
the control circuit is configured to control the transmission-side direct-current/alternating-current converter circuit based on 180-degree rectangular wave energization.

6. The non-contact power supply apparatus according to claim 4, wherein:
the reception-side direct-current/direct-current converter circuit is capable of converting a direct current supplied from the power supply target to a direct current that has a different voltage and supplying the direct current to the reception-side alternating-current/direct-current converter circuit;
the reception-side alternating-current/direct-current converter circuit is capable of converting the direct current supplied from the reception-side direct-current/direct-current converter circuit to an alternating current and supplying the alternating current to the reception-side pad connected to the reception-side resonant circuit;
the transmission-side direct-current/alternating-current converter circuit is capable of converting an alternating current supplied from the transmission-side pad connected to the transmission-side resonant circuit to a direct current and supplying the direct current to the transmission-side direct-current/direct-current converter circuit; and
the transmission-side direct-current/direct-current converter circuit is capable of converting the direct current supplied from the transmission-side direct-current/alternating-current converter circuit to a direct current that has a different voltage and supplying the direct current to the direct-current power supply.

7. The non-contact power supply apparatus according to claim 1, wherein:
the transmission-side resonant circuit and the reception-side resonant circuit are provided as capacitors.

8. The non-contact power supply apparatus according to claim 1, comprising:
a transmission-side filter circuit that is connected between the power transmission circuit and the transmission-side pad, and of which the impedance at a fundamental frequency of the alternating current supplied from the power transmission circuit is smaller than the impedance of a resonant circuit configured by the coil of the transmission-side pad and the transmission-side resonant circuit; and
a reception-side filter circuit that is connected between the reception-side pad and the power reception circuit, and of which the impedance at the fundamental frequency of the alternating current supplied from the power transmission circuit is smaller than the impedance of a resonant circuit configured by the coil of the reception-side pad and the reception-side resonant circuit.

9. The non-contact power supply apparatus according to claim 8, wherein:
the transmission-side filter circuit and the reception-side filter circuit are composed of reactors and capacitors that are connected in series, and of which resonant frequencies are set to the fundamental frequency of the alternating current supplied from the power transmission circuit.

10. The non-contact power supply apparatus according to claim 9, wherein:
the transmission-side filter circuit is composed of two pairs of serially connected reactor and capacitor of which inductances and capacities are equal to each other, in which one serially connected reactor and capacitor is connected between one output end of the power transmission circuit and one end of the transmission-side pad, and the other serially connected reactor and capacitor is connected between another output end of the power transmission circuit and another end of the transmission-side pad; and
the reception-side filter circuit includes two pairs of serially connected reactor and capacitor of which inductances and capacities are equal to each other, in which one serially connected reactor and capacitor is connected between one end of the reception-side pad and one input end of the power reception circuit, and the other serially connected reactor and capacitor is connected between another end of the reception-side pad and another input end of the power reception circuit.

11. The non-contact power supply apparatus according to claim 10, wherein:
the two pairs of reactors in at least either of the transmission-side filter circuit and the reception-side filter circuit are a coupled reactor that is configured so as to share a core.

12. The non-contact power supply apparatus according to claim 8, wherein:
the reactor in at least either of the transmission-side filter circuit and the reception-side filter circuit is configured by a combination of a plurality of reactors.

13. The non-contact power supply apparatus according to claim 8, wherein:
the capacitor in at least either of the transmission-side filter circuit and the reception-side filter circuit is configured by a combination of a plurality of capacitors.

14. The non-contact power supply apparatus according to claim 1, wherein:
the control circuit includes
a transmission-side control circuit that is connected to the power transmission circuit and controls the power transmission circuit, and
a reception-side control circuit that is connected to the power reception circuit and controls the power reception circuit; and
the transmission-side control circuit and the reception-side control circuit are configured to transmit and receive information required for control using wireless communication.

15. The non-contact power supply apparatus according to claim 5, wherein:
the reception-side direct-current/direct-current converter circuit—is capable of converting a direct current supplied from the power supply target to a direct current that has a different voltage and supplying the direct current to the reception-side alternating-current/direct-current converter circuit;
the reception-side alternating-current/direct-current converter circuit is capable of converting the direct current supplied from the reception-side direct-current/direct-current converter circuit to an alternating current and supplying the alternating current to the reception-side pad connected to the reception-side resonant circuit;
the transmission-side direct-current/alternating-current converter circuit is capable of converting an alternating current supplied from the transmission-side pad connected to the transmission-side resonant circuit to a direct current and supplying the direct current to the transmission-side direct-current/direct-current converter circuit; and
the transmission-side direct-current/direct-current converter circuit is capable of converting the direct current supplied from the transmission-side direct-current/alternating-current converter circuit to a direct current that has a different voltage and supplying the direct current to the direct-current power supply.

16. The non-contact power supply apparatus according to claim 2, wherein:
the transmission-side resonant circuit and the reception-side resonant circuit are provided as capacitors.

17. The non-contact power supply apparatus according claim 2, comprising:
a transmission-side filter circuit that is connected between the power transmission circuit and the transmission-side pad, and of which the impedance at a fundamental frequency of the alternating current supplied from the power transmission circuit is smaller than the impedance of a resonant circuit configured by the coil of the transmission-side pad and the transmission-side resonant circuit; and
a reception-side filter circuit that is connected between the reception-side pad and the power reception circuit, and of which the impedance at the fundamental frequency of the alternating current supplied from the power transmission circuit is smaller than the impedance of a resonant circuit configured by the coil of the reception-side pad and the reception-side resonant circuit.

18. The non-contact power supply apparatus according to claim 3, wherein:
the transmission-side resonant circuit and the reception-side resonant circuit are provided as capacitors.

19. The non-contact power supply apparatus according claim 3, comprising:
a transmission-side filter circuit that is connected between the power transmission circuit and the transmission-side pad, and of which the impedance at a fundamental frequency of the alternating current supplied from the power transmission circuit is smaller than the impedance of a resonant circuit configured by the coil of the transmission-side pad and the transmission-side resonant circuit; and
a reception-side filter circuit that is connected between the reception-side pad and the power reception circuit, and of which the impedance at the fundamental frequency of the alternating current supplied from the power transmission circuit is smaller than the impedance of a resonant circuit configured by the coil of the reception-side pad and the reception-side resonant circuit.

20. The non-contact power supply apparatus according to claim 2, wherein:
the control circuit includes
a transmission-side control circuit that is connected to the power transmission circuit and controls the power transmission circuit, and
a reception-side control circuit that is connected to the power reception circuit and controls the power reception circuit; and
the transmission-side control circuit and the reception-side control circuit are configured to transmit and receive information required for control using wireless communication.

\* \* \* \* \*